US012677302B2

(12) United States Patent
Wu

(10) Patent No.: US 12,677,302 B2
(45) Date of Patent: Jul. 7, 2026

(54) MANAGING MULTICAST AND BROADCAST SERVICES

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 398 days.

(21) Appl. No.: 18/018,462

(22) PCT Filed: Jul. 29, 2021

(86) PCT No.: PCT/US2021/043594
§ 371 (c)(1),
(2) Date: Jan. 27, 2023

(87) PCT Pub. No.: WO2022/126637
PCT Pub. Date: Feb. 3, 2022

(65) Prior Publication Data
US 2023/0269758 A1     Aug. 24, 2023

Related U.S. Application Data

(60) Provisional application No. 63/059,259, filed on Jul. 31, 2020.

(51) Int. Cl.
*H04W 72/30*     (2023.01)
*H04W 72/23*     (2023.01)
(52) U.S. Cl.
CPC ........... *H04W 72/30* (2023.01); *H04W 72/23* (2023.01)

(58) Field of Classification Search
CPC . H04W 72/53; H04W 72/0453; H04W 72/56; H04W 76/11; H04W 76/14;
(Continued)

(56) References Cited

U.S. PATENT DOCUMENTS 10,743,161 B2 *   8/2020   Agiwal ................. H04W 76/14
2019/0165915 A1   5/2019   John Wilson et al.
(Continued)

FOREIGN PATENT DOCUMENTS

CN       103636278 A     3/2014
CN       110 798 861 A   2/2020
(Continued)

OTHER PUBLICATIONS

International Search Report and Written Opinion for Application No. PCT/US2021/043594, dated Nov. 23, 2021.
(Continued)

*Primary Examiner* — Dady Chery
(74) *Attorney, Agent, or Firm* — MARSHALL, GERSTEIN & BORUN LLP

(57)     ABSTRACT

A base station for configuring bandwidth parts (BWPs) in a certain cell, for access by UEs, configures (1502) an initial BWP within a bandwidth of a cell, configures (1504) a multicast and broadcast services (MBS) BWP within the bandwidth of the cell, wherein the MBS BWP is dedicated to conveying MBS information, and transmits (1506), in the cell, an indication of the initial BWP and the MBS BWP, to provide a UE with access to the initial BWP and the MBS BWP.

13 Claims, 19 Drawing Sheets

(58) Field of Classification Search
CPC ..... H04W 72/02; H04W 92/18; H04W 28/18;
H04W 28/20; H04W 72/51; H04W 72/20;
H04W 72/30; H04W 72/23; H04W 72/29;
H04L 5/0007; H04L 5/001; H04L 5/0044;
H04L 5/0094
See application file for complete search history.

(56) References Cited

U.S. PATENT DOCUMENTS

| | | | |
|---|---|---|---|
| 2020/0267511 A1 | 8/2020 | Abdoli et al. | |
| 2021/0127359 A1 | 4/2021 | Takeda et al. | |
| 2021/0168814 A1* | 6/2021 | Chen ..................... | H04W 72/02 |

FOREIGN PATENT DOCUMENTS

| | | |
|---|---|---|
| CN | 111406422 A | 7/2020 |
| KR | 10-2020-0073118 A | 6/2020 |
| WO | WO-2020/030177 A1 | 2/2020 |
| WO | WO-2020/033089 A1 | 2/2020 |
| WO | WO-2020/049812 A1 | 3/2020 |
| WO | WO-2020/253849 A1 | 12/2020 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.0.0 (2019).

"3rd Generation Partnership Project; Technical Specification Group Radio Access Network; Evolved Universal Terrestrial Radio Access (E-UTRA); Radio Resource Control (RRC); Protocol specification (Release 16)," 3GPP TS 36.331 V16.0.0 (2020).

"3rd Generation Partnership Project; Technical Specification Group Services and System Aspects; Study on architectural enhancements for 5G multicast-broadcast services (Release 17)," 3GPP TR 23.757 V0.4.0 (2020).

Huawei, "New Work Item on NR support of Multicast and Broadcast Services," 3GPP TSG RAN Meeting #86 (2019).

Huawei, "WID revision: NR Multicast and Broadcast Services," 3GPP TSG RAN Meeting #88-e (2020).

First Office Action for Chinese Application No. 202180065520.9, dated Mar. 21, 2026.

* cited by examiner

104 / 106A / 106B

200 ➘

300C

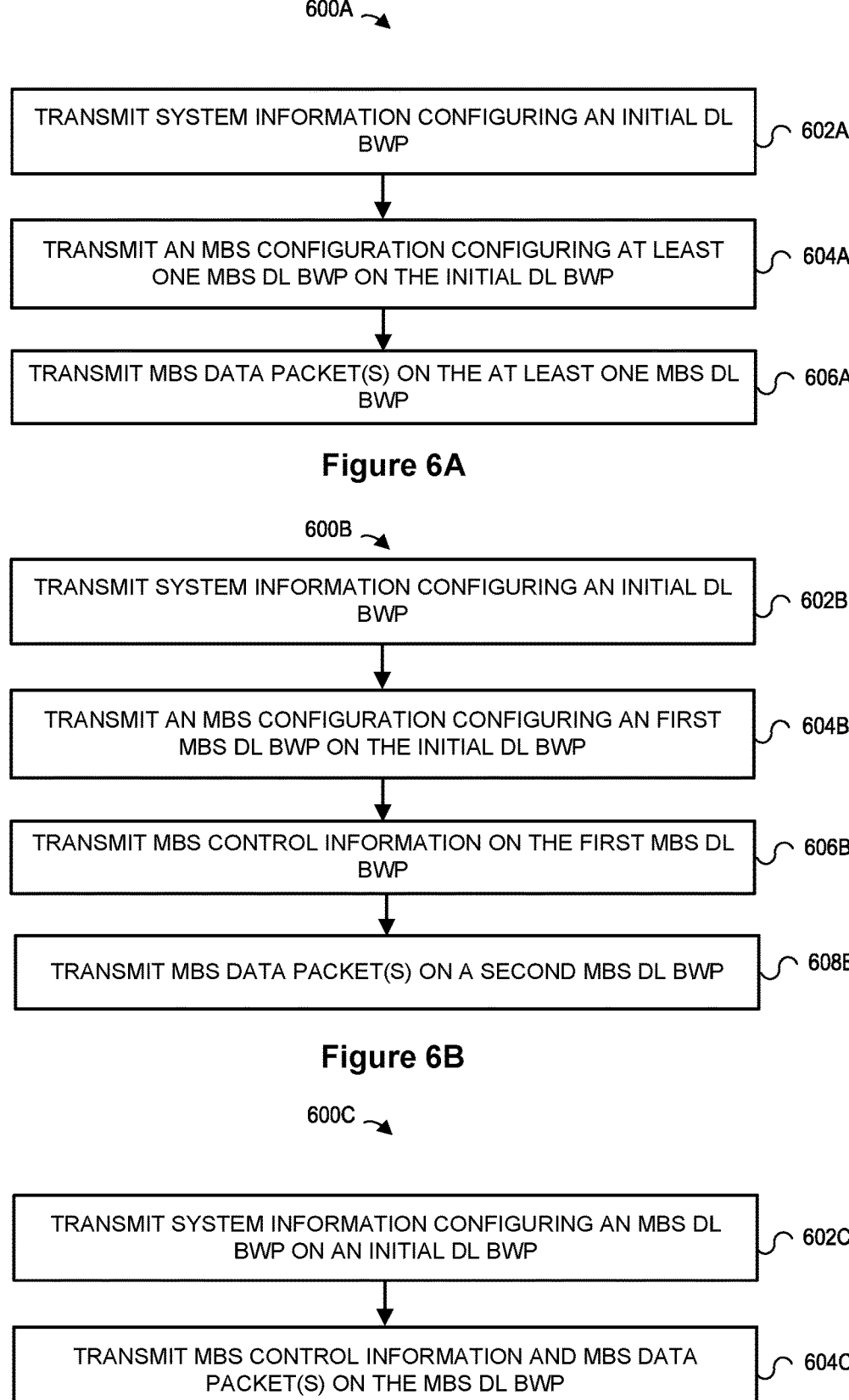

600A

TRANSMIT SYSTEM INFORMATION CONFIGURING AN INITIAL DL BWP — 602A

TRANSMIT AN MBS CONFIGURATION CONFIGURING AT LEAST ONE MBS DL BWP ON THE INITIAL DL BWP — 604A

TRANSMIT MBS DATA PACKET(S) ON THE AT LEAST ONE MBS DL BWP — 606A

TRANSMIT SYSTEM INFORMATION CONFIGURING AN INITIAL DL BWP — 602B

TRANSMIT AN MBS CONFIGURATION CONFIGURING AN FIRST MBS DL BWP ON THE INITIAL DL BWP — 604B

TRANSMIT MBS CONTROL INFORMATION ON THE FIRST MBS DL BWP — 606B

TRANSMIT MBS DATA PACKET(S) ON A SECOND MBS DL BWP — 608B

TRANSMIT SYSTEM INFORMATION CONFIGURING AN MBS DL BWP ON AN INITIAL DL BWP — 602C

TRANSMIT MBS CONTROL INFORMATION AND MBS DATA PACKET(S) ON THE MBS DL BWP — 604C

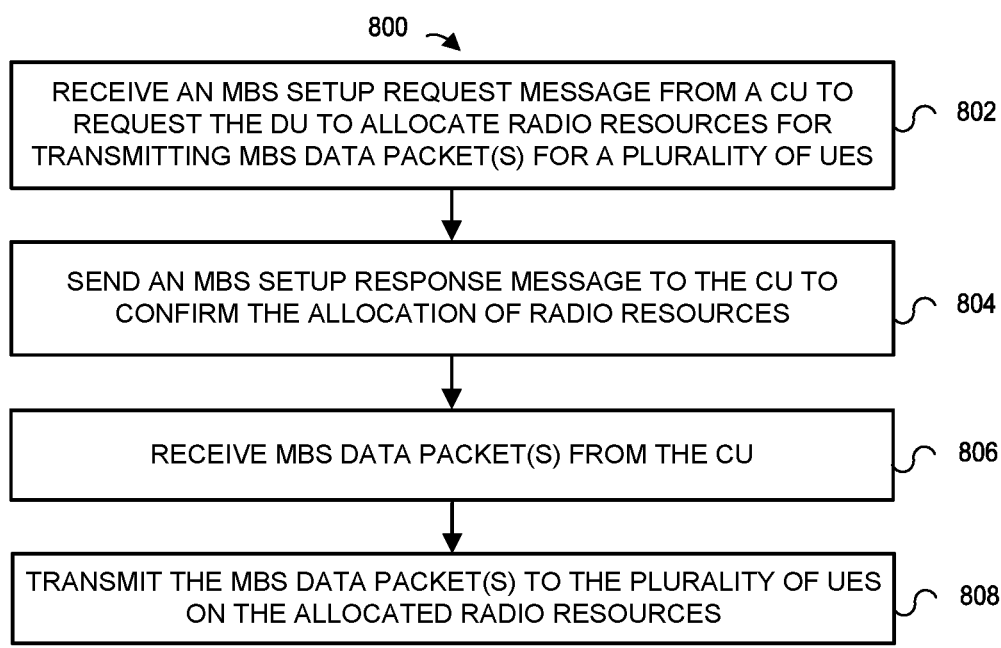

| RECEIVE AN MBS SETUP REQUEST MESSAGE FROM A CU TO REQUEST THE DU TO ALLOCATE RADIO RESOURCES FOR TRANSMITTING MBS DATA PACKET(S) FOR A PLURALITY OF UES | 802 |

| SEND AN MBS SETUP RESPONSE MESSAGE TO THE CU TO CONFIRM THE ALLOCATION OF RADIO RESOURCES | 804 |

| RECEIVE MBS DATA PACKET(S) FROM THE CU | 806 |

| TRANSMIT THE MBS DATA PACKET(S) TO THE PLURALITY OF UES ON THE ALLOCATED RADIO RESOURCES | 808 |

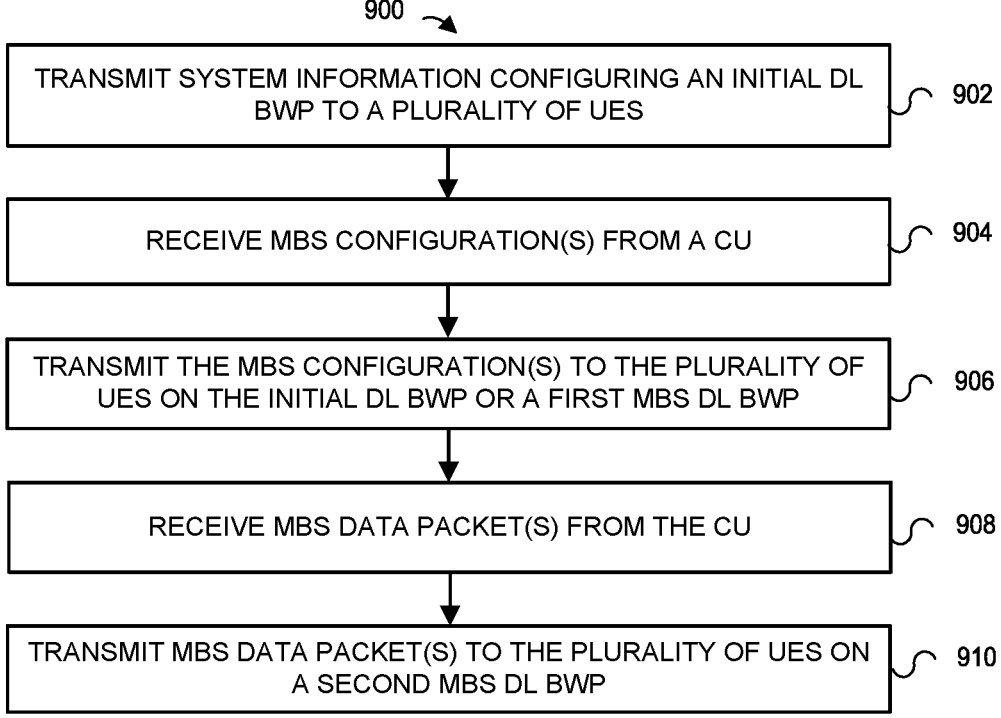

| TRANSMIT SYSTEM INFORMATION CONFIGURING AN INITIAL DL BWP TO A PLURALITY OF UES | 902 |

| RECEIVE MBS CONFIGURATION(S) FROM A CU | 904 |

| TRANSMIT THE MBS CONFIGURATION(S) TO THE PLURALITY OF UES ON THE INITIAL DL BWP OR A FIRST MBS DL BWP | 906 |

| RECEIVE MBS DATA PACKET(S) FROM THE CU | 908 |

| TRANSMIT MBS DATA PACKET(S) TO THE PLURALITY OF UES ON A SECOND MBS DL BWP | 910 |

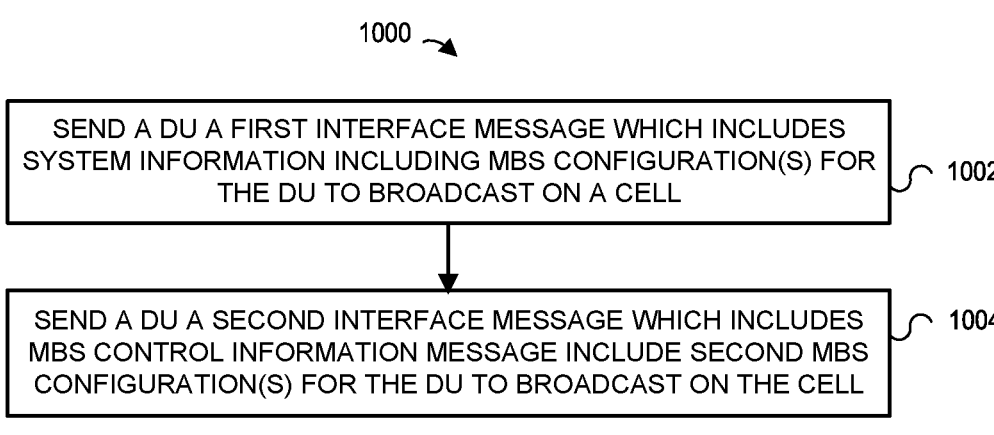

| | |
|---|---|
| SEND A DU A FIRST INTERFACE MESSAGE WHICH INCLUDES SYSTEM INFORMATION INCLUDING MBS CONFIGURATION(S) FOR THE DU TO BROADCAST ON A CELL | 1002 |
| SEND A DU A SECOND INTERFACE MESSAGE WHICH INCLUDES MBS CONTROL INFORMATION MESSAGE INCLUDE SECOND MBS CONFIGURATION(S) FOR THE DU TO BROADCAST ON THE CELL | 1004 |

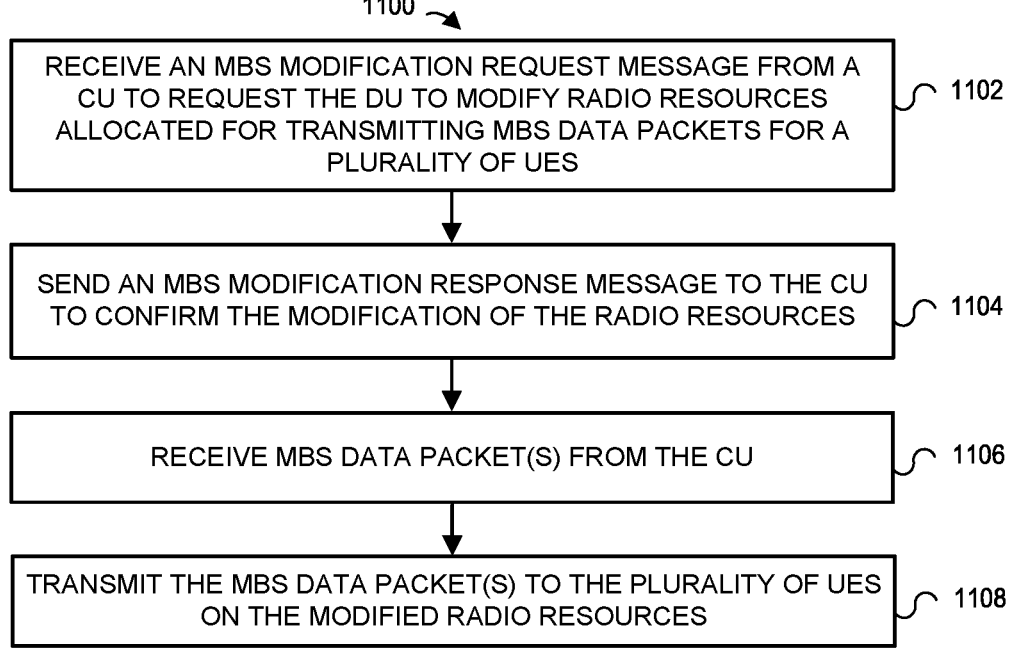

| | |
|---|---|
| RECEIVE AN MBS MODIFICATION REQUEST MESSAGE FROM A CU TO REQUEST THE DU TO MODIFY RADIO RESOURCES ALLOCATED FOR TRANSMITTING MBS DATA PACKETS FOR A PLURALITY OF UES | 1102 |
| SEND AN MBS MODIFICATION RESPONSE MESSAGE TO THE CU TO CONFIRM THE MODIFICATION OF THE RADIO RESOURCES | 1104 |
| RECEIVE MBS DATA PACKET(S) FROM THE CU | 1106 |
| TRANSMIT THE MBS DATA PACKET(S) TO THE PLURALITY OF UES ON THE MODIFIED RADIO RESOURCES | 1108 |

| RECEIVE AN MBS RELEASE REQUEST MESSAGE FROM A CU TO REQUEST THE DU TO RELEASE RADIO RESOURCES FOR TRANSMITTING MBS DATA PACKETS FOR A PLURALITY OF UES | 1202 |

| RELEASE ALLOCATED RADIO RESOURCES | 1204 |

| SEND AN MBS RELEASE RESPONSE MESSAGE TO THE CU TO CONFIRM THE RELEASE OF RADIO RESOURCES | 1206 |

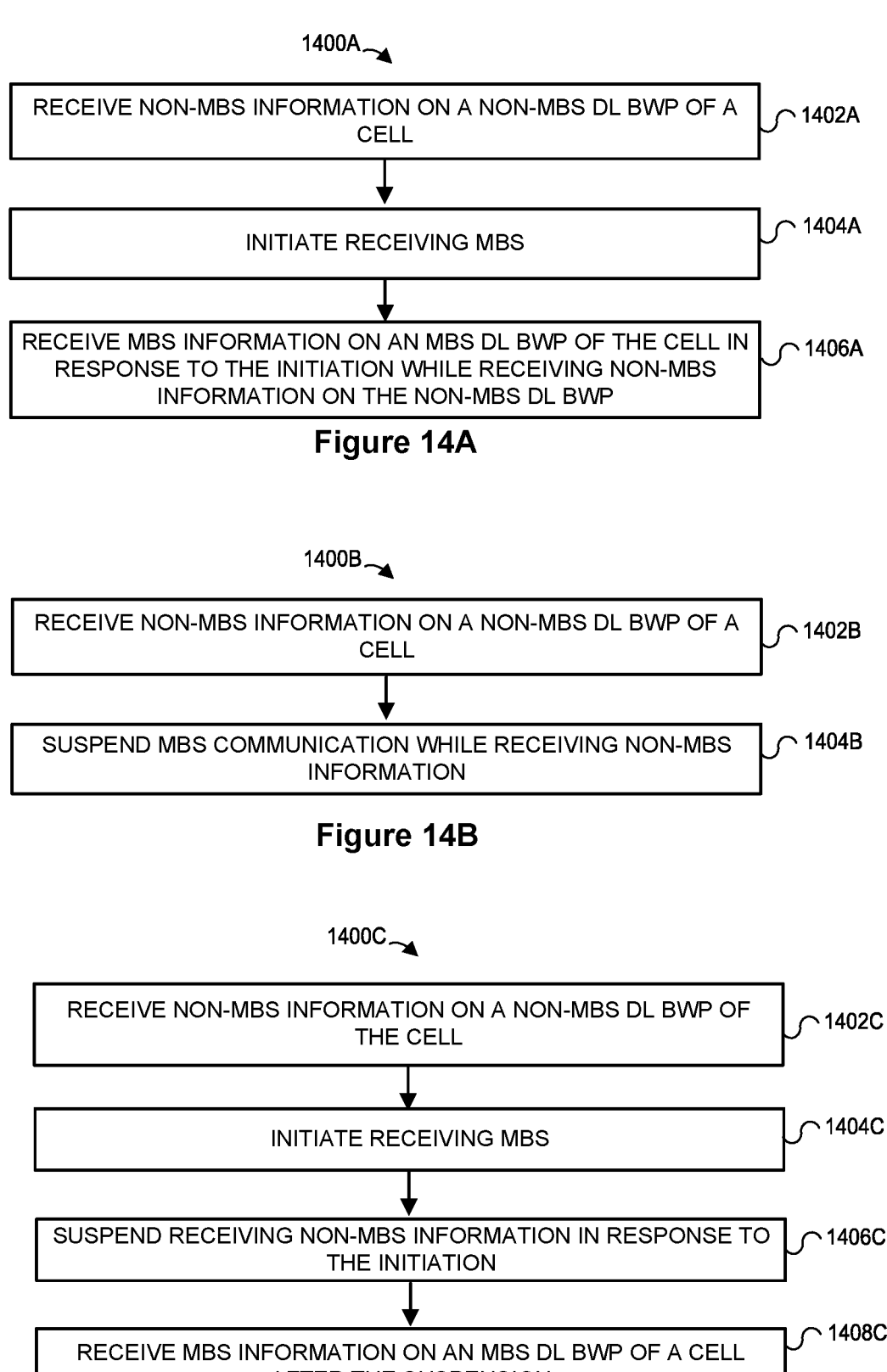

1400A

RECEIVE NON-MBS INFORMATION ON A NON-MBS DL BWP OF A CELL          1402A

INITIATE RECEIVING MBS          1404A

RECEIVE MBS INFORMATION ON AN MBS DL BWP OF THE CELL IN RESPONSE TO THE INITIATION WHILE RECEIVING NON-MBS INFORMATION ON THE NON-MBS DL BWP          1406A

RECEIVE NON-MBS INFORMATION ON A NON-MBS DL BWP OF A CELL          1402B

SUSPEND MBS COMMUNICATION WHILE RECEIVING NON-MBS INFORMATION          1404B

RECEIVE NON-MBS INFORMATION ON A NON-MBS DL BWP OF THE CELL          1402C

INITIATE RECEIVING MBS          1404C

SUSPEND RECEIVING NON-MBS INFORMATION IN RESPONSE TO THE INITIATION          1406C

RECEIVE MBS INFORMATION ON AN MBS DL BWP OF A CELL AFTER THE SUSPENSION          1408C

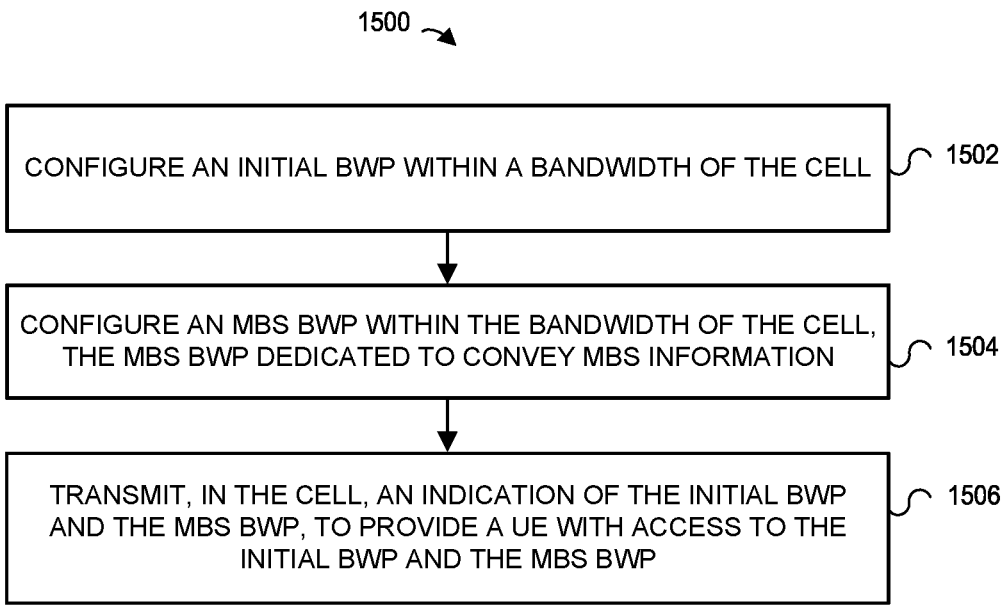

CONFIGURE AN INITIAL BWP WITHIN A BANDWIDTH OF THE CELL    1502

CONFIGURE AN MBS BWP WITHIN THE BANDWIDTH OF THE CELL, THE MBS BWP DEDICATED TO CONVEY MBS INFORMATION    1504

TRANSMIT, IN THE CELL, AN INDICATION OF THE INITIAL BWP AND THE MBS BWP, TO PROVIDE A UE WITH ACCESS TO THE INITIAL BWP AND THE MBS BWP    1506

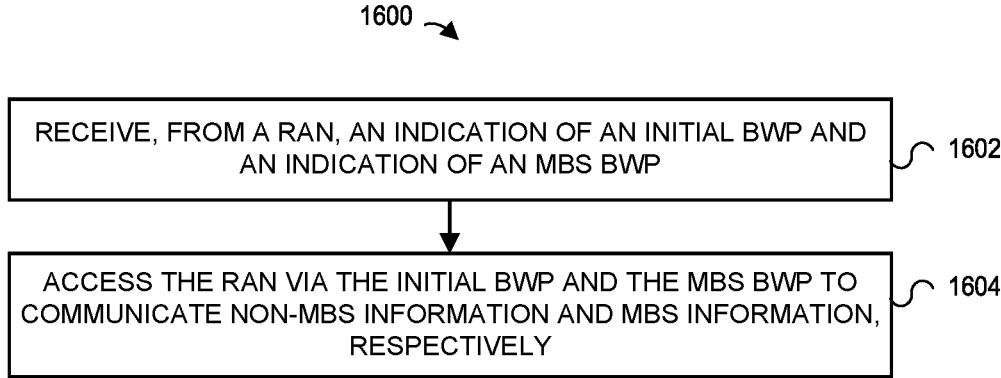

RECEIVE, FROM A RAN, AN INDICATION OF AN INITIAL BWP AND AN INDICATION OF AN MBS BWP    1602

ACCESS THE RAN VIA THE INITIAL BWP AND THE MBS BWP TO COMMUNICATE NON-MBS INFORMATION AND MBS INFORMATION, RESPECTIVELY    1604

Figure 16

MANAGING MULTICAST AND BROADCAST SERVICES

CROSS-REFERENCE TO RELATED APPLICATIONS

This patent application is a national stage application, filed under 35 U.S.C. § 371, of International Application No. PCT/US2021/043594, filed Jul. 29, 2021 and entitled "MANAGING MULTICAST AND BROADCAST SER-VICES," which claims priority to U.S. Provisional Application No. 63/059,259, filed Jul. 31, 2020 and entitled "MANAGING MULTICAST AND BROADCAST SER-VICES," the disclosures of which are incorporated by reference herein in their entireties.

FIELD OF THE DISCLOSURE

This disclosure relates to wireless communications and, more particularly, to managing radio resources for multicast and broadcast services (MBS).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Base stations that operate according to fifth-generation (5G) New Radio (NR) requirements support significantly larger bandwidth than fourth-generation (4G) base stations. Accordingly, the Third Generation Partnership Project (3GPP) has proposed that for Release 15, user equipment units (UEs) support a 100 MHz bandwidth in frequency range 1 (FR1) and a 400 MHz bandwidth in frequency range 2 (FR2). Due to the relatively wide bandwidth of a typical carrier, a 5G NR base station can configure a UE to operate within certain bandwidth parts (BWP), or a portion of the full carrier made up of a contiguous set of physical resource blocks. For example, the full carrier bandwidth may be 200 MHz, and the base station can configure a 100 MHz BWP for the UE. The BWP can include a downlink (DL) and an uplink (UL) components. The base station can configure an initial BWP via which a UE can access the radio access network (RAN).

Although base stations can transmit unicast information on the initial BWP, the base stations cannot multicast or broadcast the same information to numerous UEs when the bandwidth of the cell is partitioned into other BWPs. Thus, these base stations lack a multicast and broadcast services (MBS) delivery mechanism that can be useful in many content delivery applications, such as transparent IPv4/IPv6 multicast delivery, IPTV, software delivery over wireless, group communications and IoT applications, V2X applications, emergency messages related to public safety, to name a few.

SUMMARY

A base station of this disclosure configures an initial BWP within a bandwidth of a certain cell, and, to support multicasting or broadcasting to UEs, at least one additional BWP (i.e., MBS BWP) (which also can be referred to as "frequency region") within the same bandwidth of the cell dedicated for multicasting or broadcasting MBS information (i.e., MBS control signals, MBS data) to UEs. The base station can configure the MBS BWP to have a larger width relative to that of the initial BWP, a smaller width relative to that of the initial BWP, or the same width to that of the initial BWP. The UEs can support both the initial BWP and the MBS BWP, but generally select the wider BWP to obtain a higher a data rate, unless there is a reason why selecting the wider BWP is not suitable in some cases.

In some implementations or scenarios, the base station configures the MBS BWP to be entirely within a wider initial BWP, partially overlap the wider initial BWP, or have no overlap with the wider initial BWP. In other implementations or scenarios, the base station configures the initial BWP to be entirely within a wider MBS BWP, partially overlap the wider MBS BWP, or have no overlap with the wider MBS BWP. The base station can indicate the initial BWP and MBS BWP in a system information block (SIB) which the base station broadcasts in the cell.

A UE can transmit a random access preamble to the base station on the UL component of the initial BWP in order to access the cell. The base station can transmit a random access response on the DL component of the selected initial BWP. The base station subsequently can provide MBS BWP configuration(s) to the UE that can be wider than or narrower than the bandwidth of the initial BWP configuration. Thus, MBS BWP configuration(s) can include one or more narrower MBS BWP(s) or wider MBS BWP(s), as described above.

One example embodiment of these techniques is a method implemented in a base station. The method can be executed by processing hardware and includes configuring an initial bandwidth part (BWP) within a bandwidth of a cell, configuring an MBS BWP within the bandwidth of the cell, wherein the MBS BWP is dedicated to conveying MBS information, and transmitting, in the cell, an indication of the initial BWP and the MBS BWP, to provide a user equipment (UE) with access to the initial BWP and the MBS BWP.

Another example embodiment of these techniques is a base station including processing hardware configured to execute the method above.

Yet another example embodiment of these techniques is a method in a UE for accessing a radio access network (RAN). The method can be executed by processing hardware and includes receiving, from the RAN, an indication of an initial BWP and an indication of an MBS BWP, and accessing the RAN via the initial BWP and the MBS BWP to communicate non-MBS information and MBS information, respectively.

Still another embodiment of these techniques is a UE including processing hardware configured to execute the method above.

3

Figure 1A:
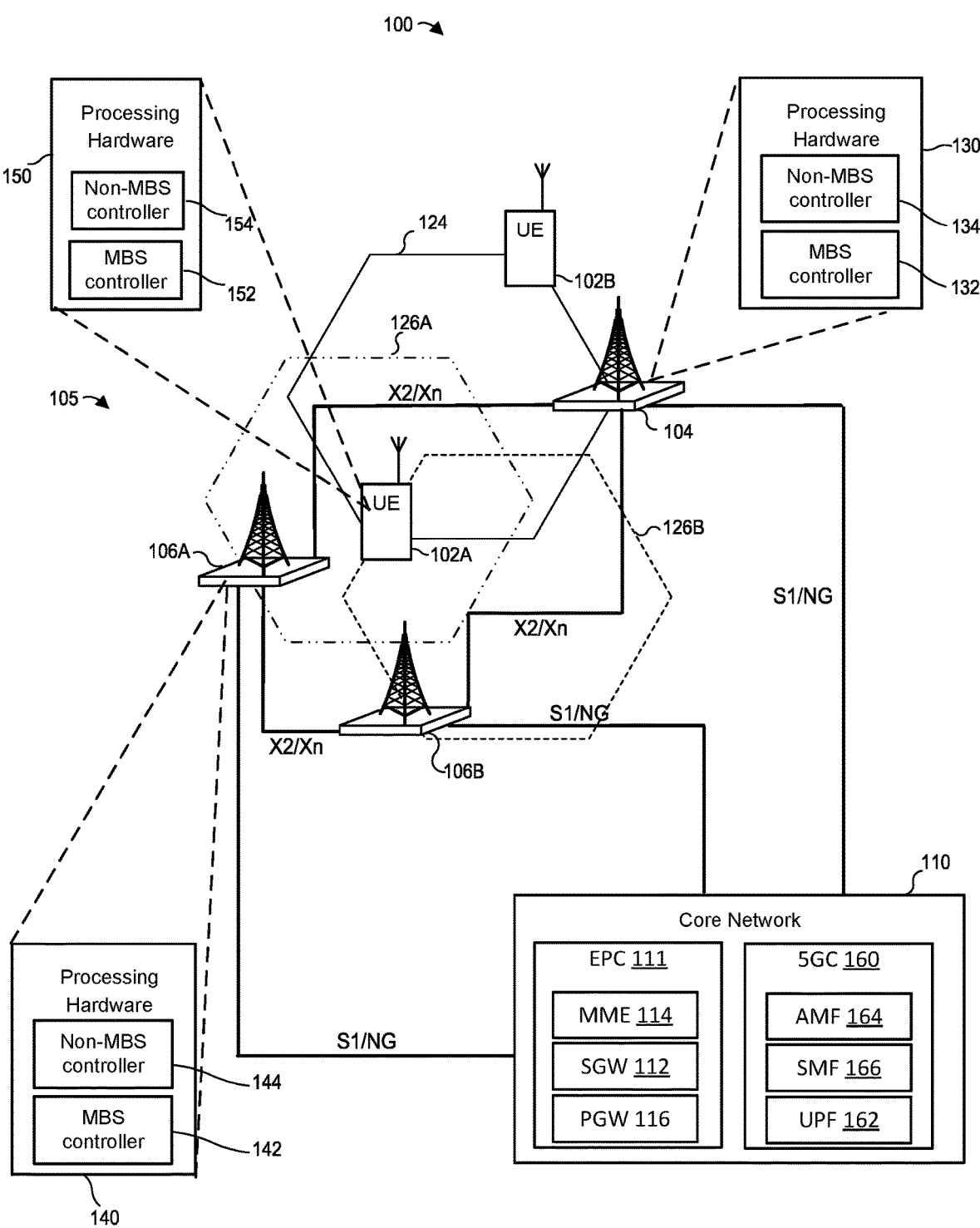
FIG. 1A is a block diagram of an example communication system in which a base station configures bandwidth parts (BWPs) in a certain cell, for access by UEs.
Figure 1B:
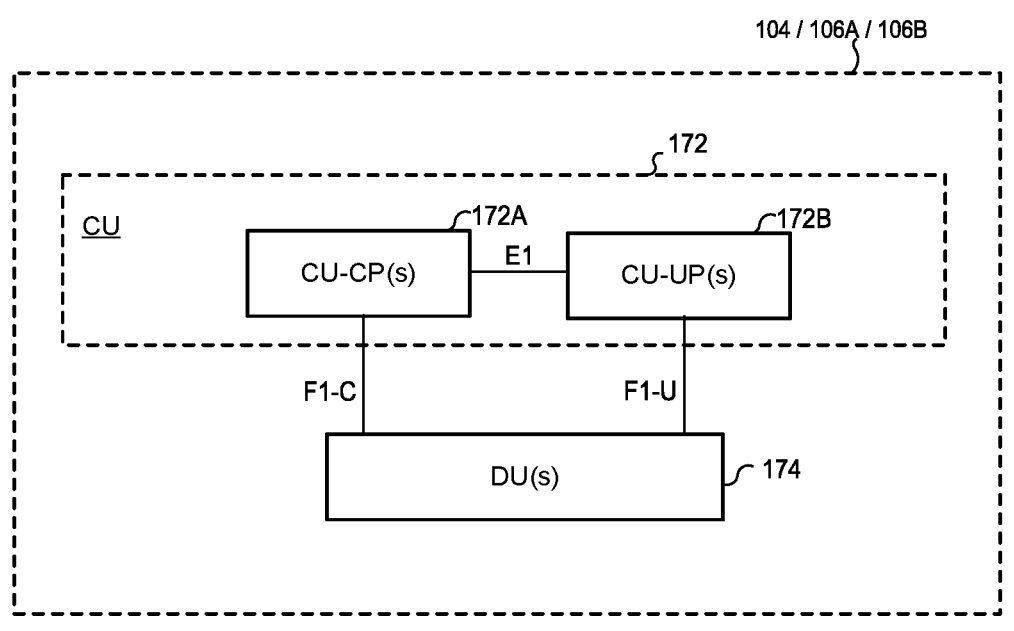
FIG. 1B is a block diagram of an example base station in which a centralized unit (CU) and a distributed unit (DU) can operate in the system of FIG. 1A.
Figure 3A:
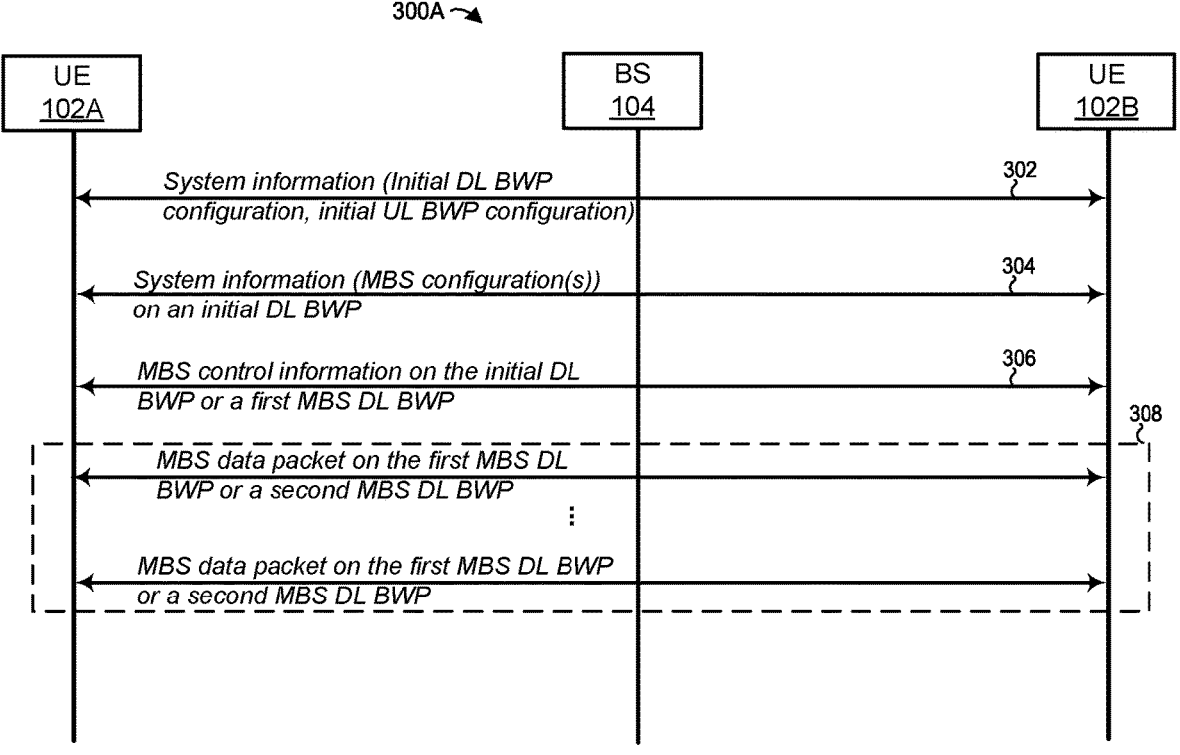
FIG. 3A is a messaging diagram of an example scenario in which the base station of FIG. 1A configures an initial BWP within a bandwidth of a certain cell, and, to support
Figure 3B:
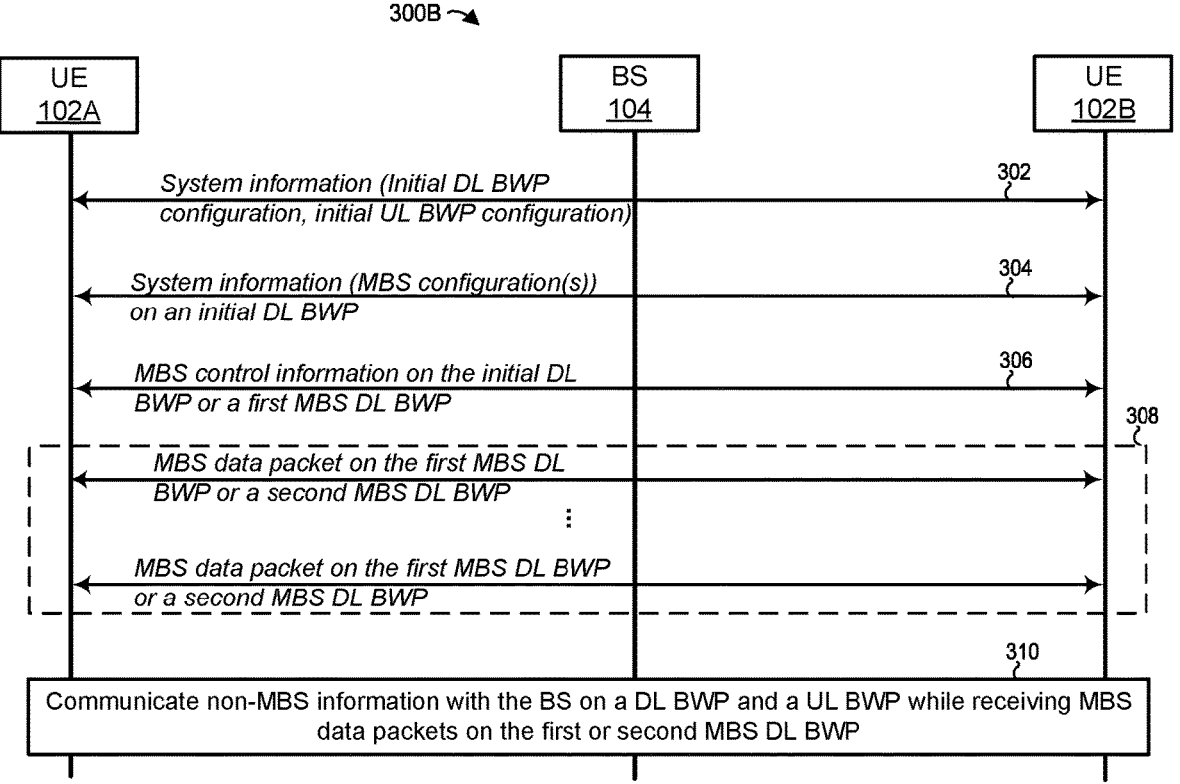
Figure 3C:
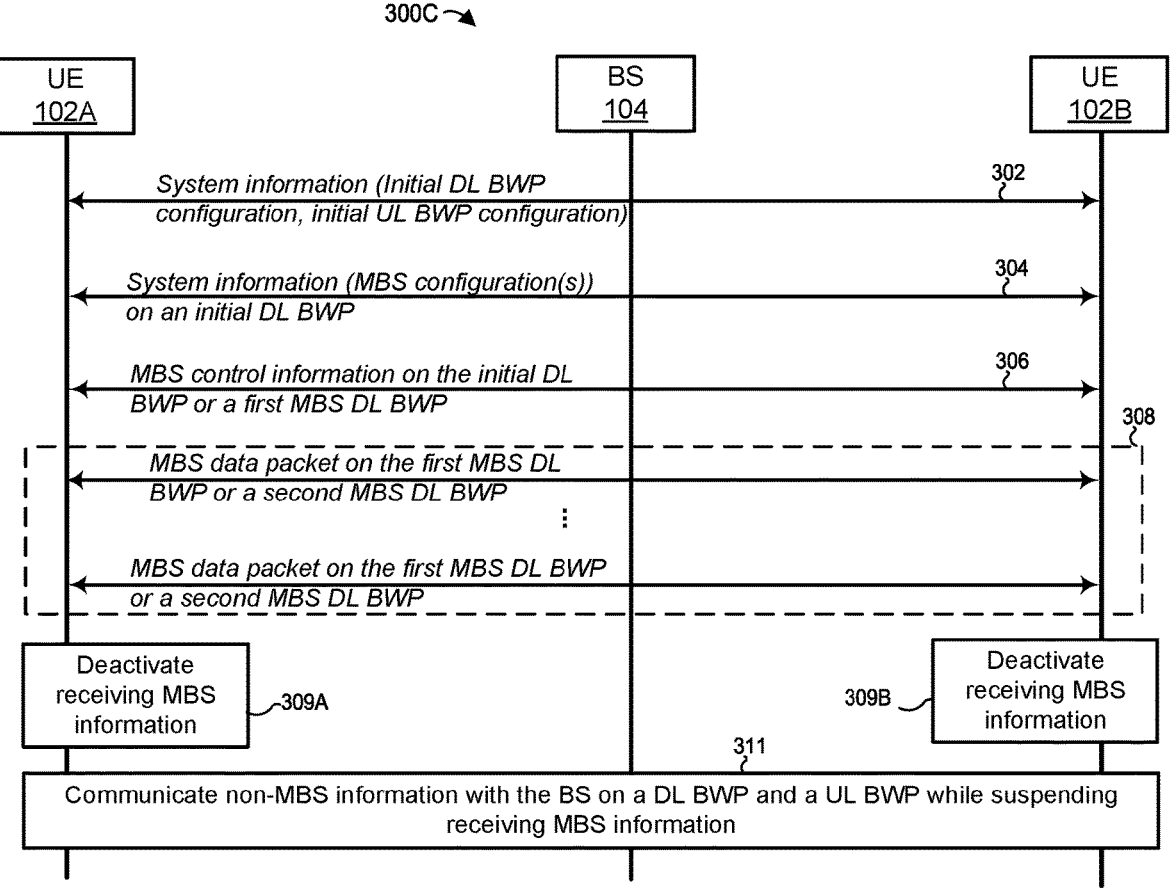
Figure 4A:
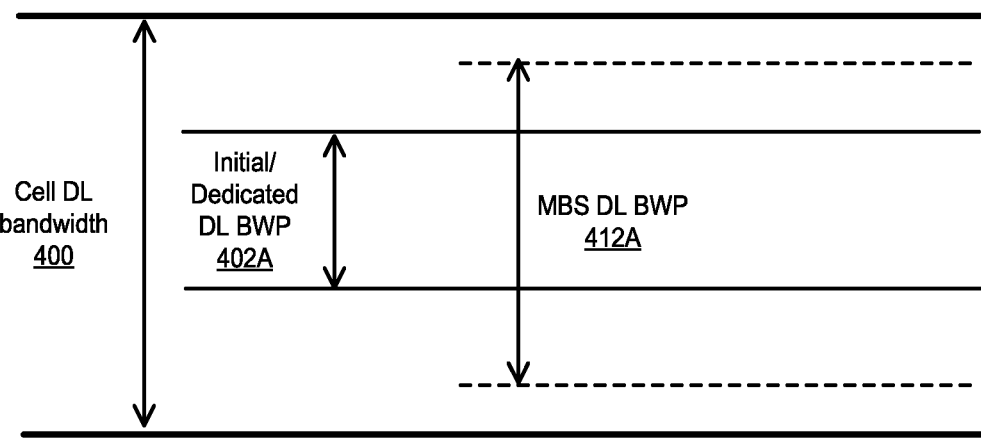
Figure 4B:
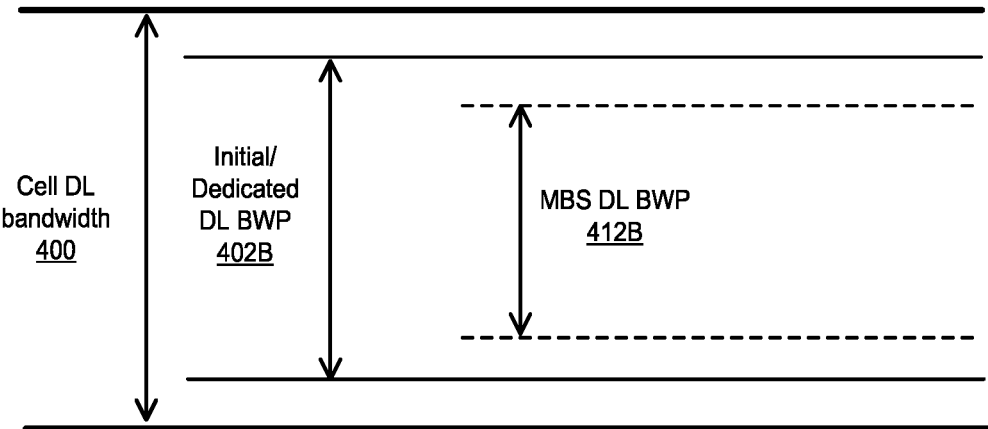
Figure 4C:
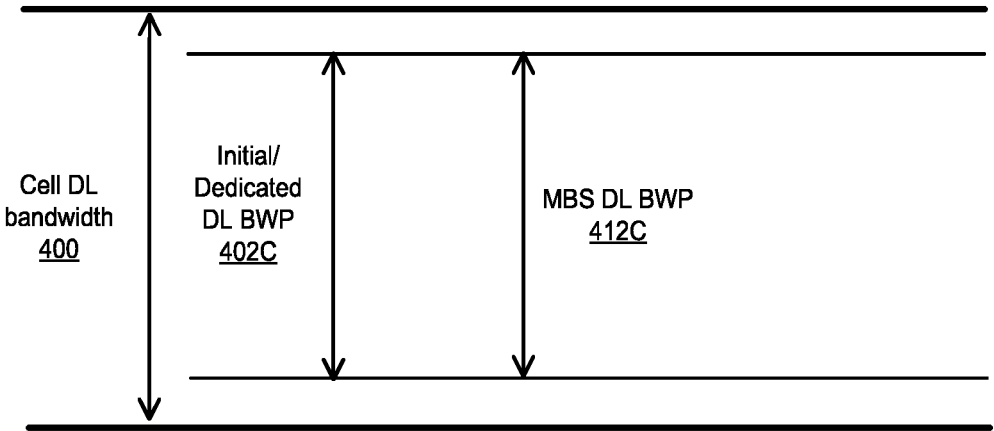
Figure 4D:
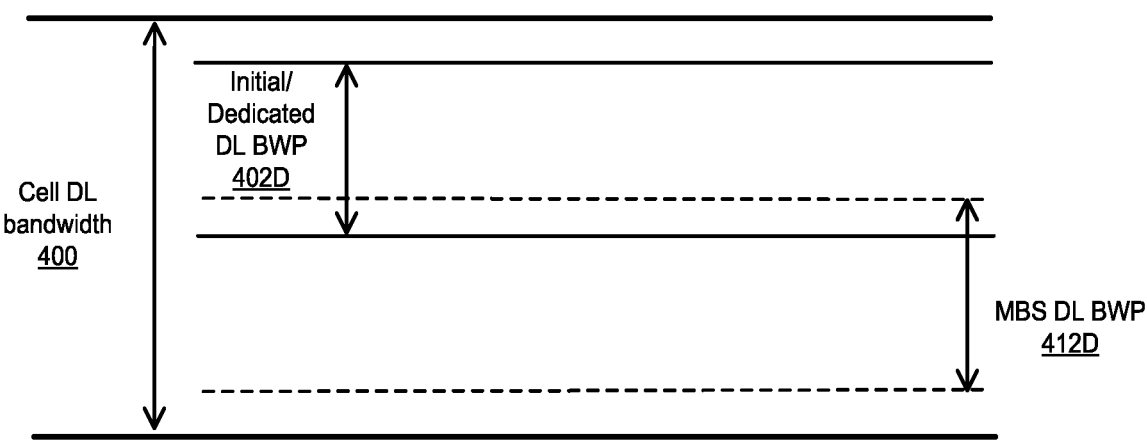
Figure 4E:
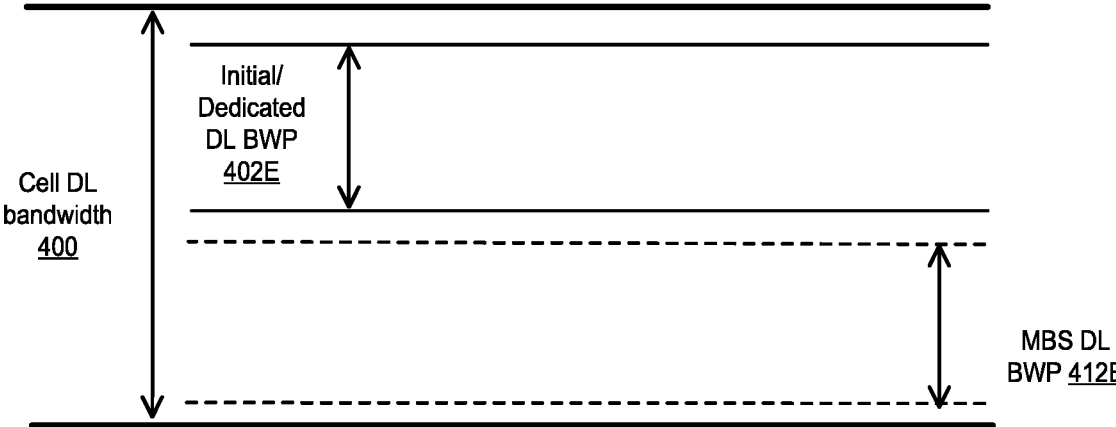
Figure 4F:
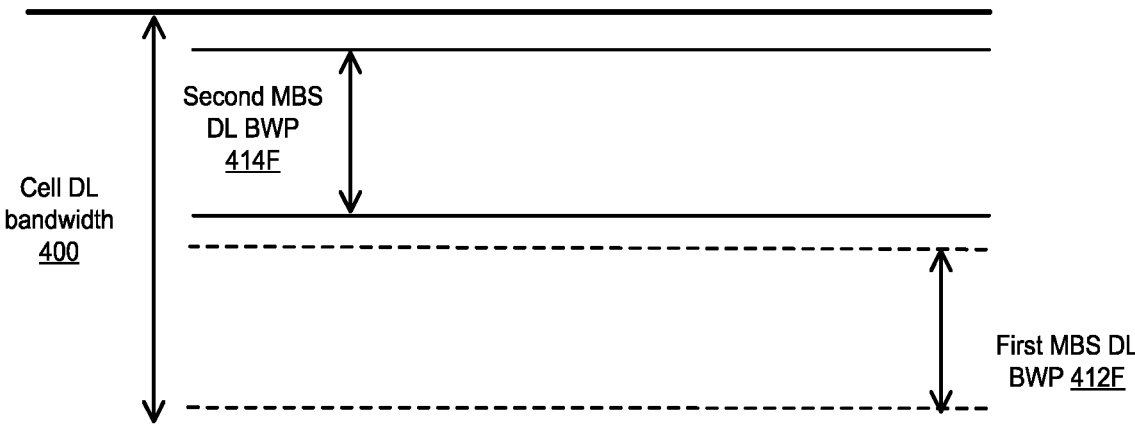
Figure 5A:
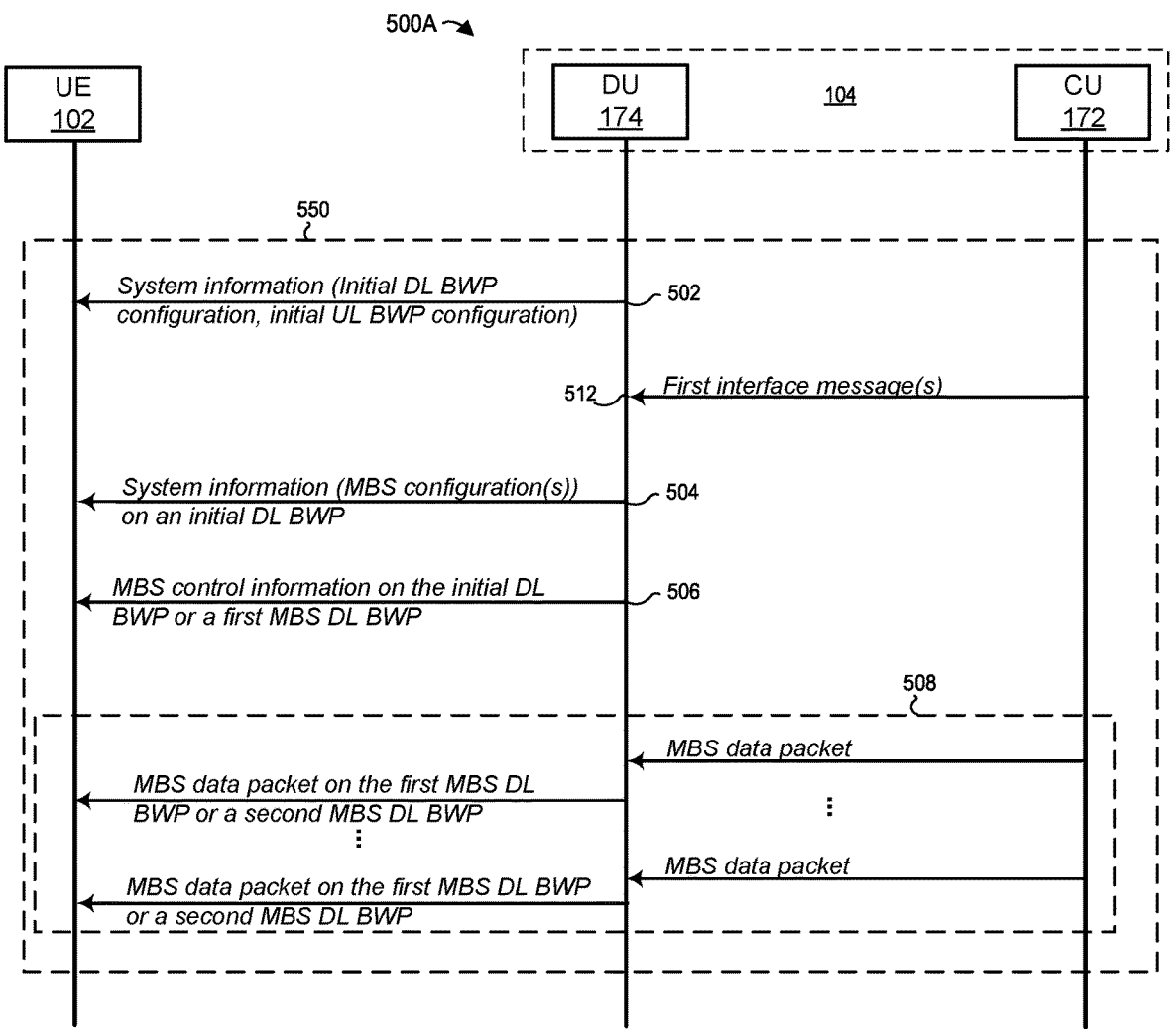
Figure 5B:
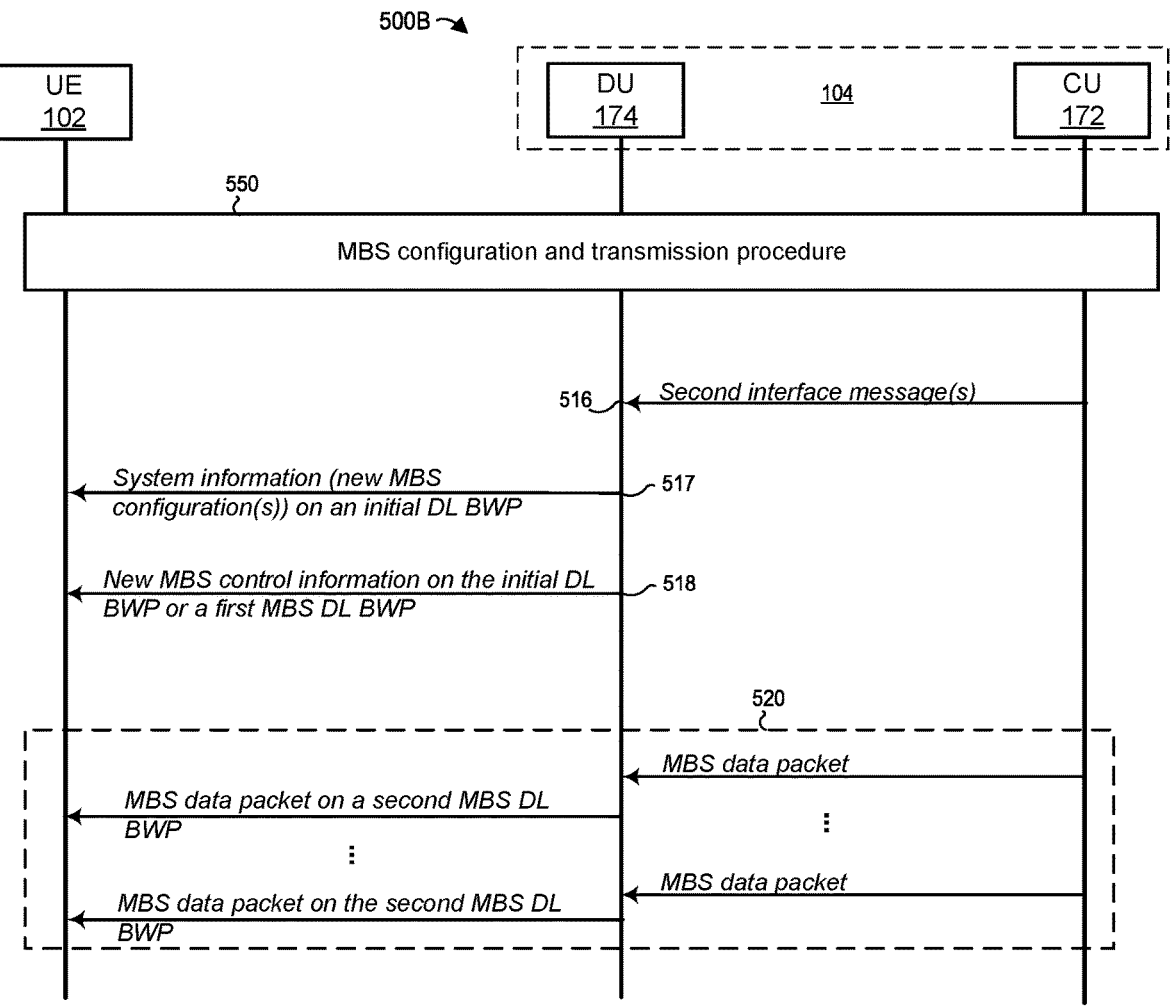
Figure 5C:
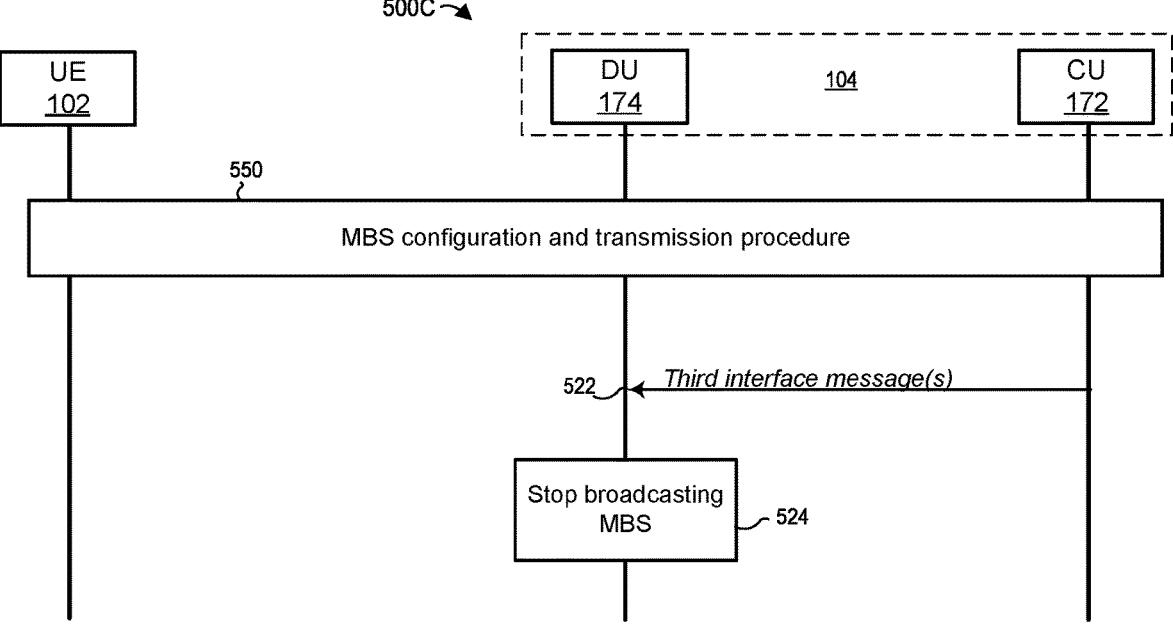
Figure 7A:
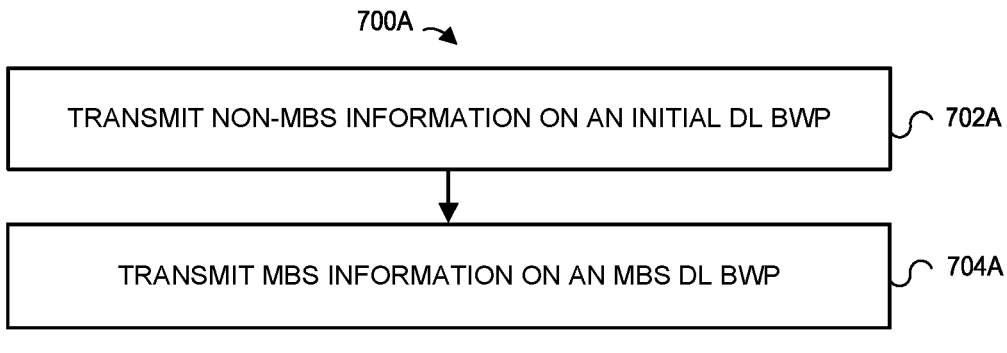
Figure 7B:
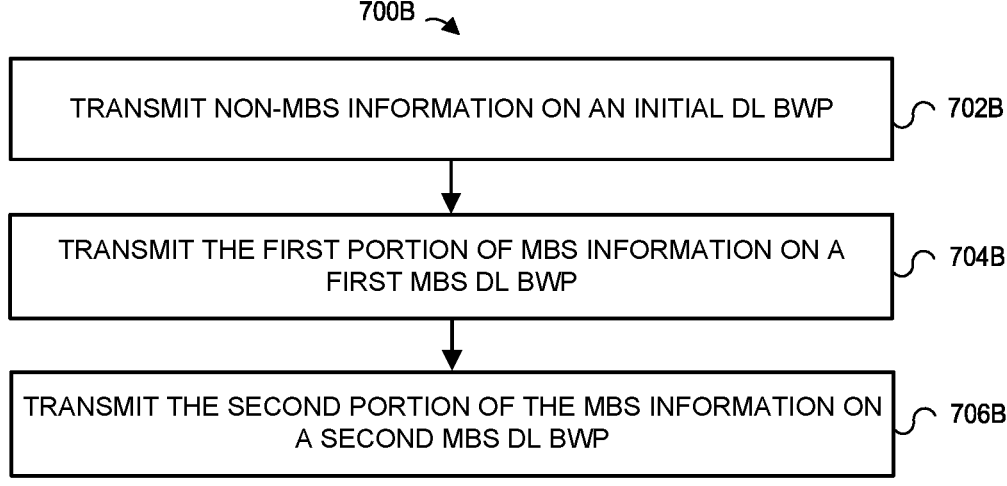
Figure 12:
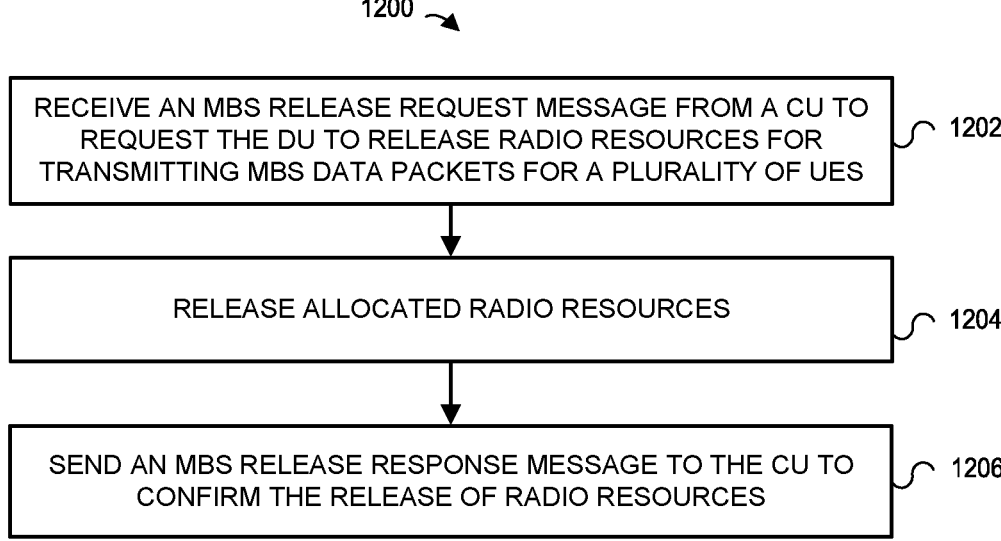
Figures 13A, 13B, 13C:
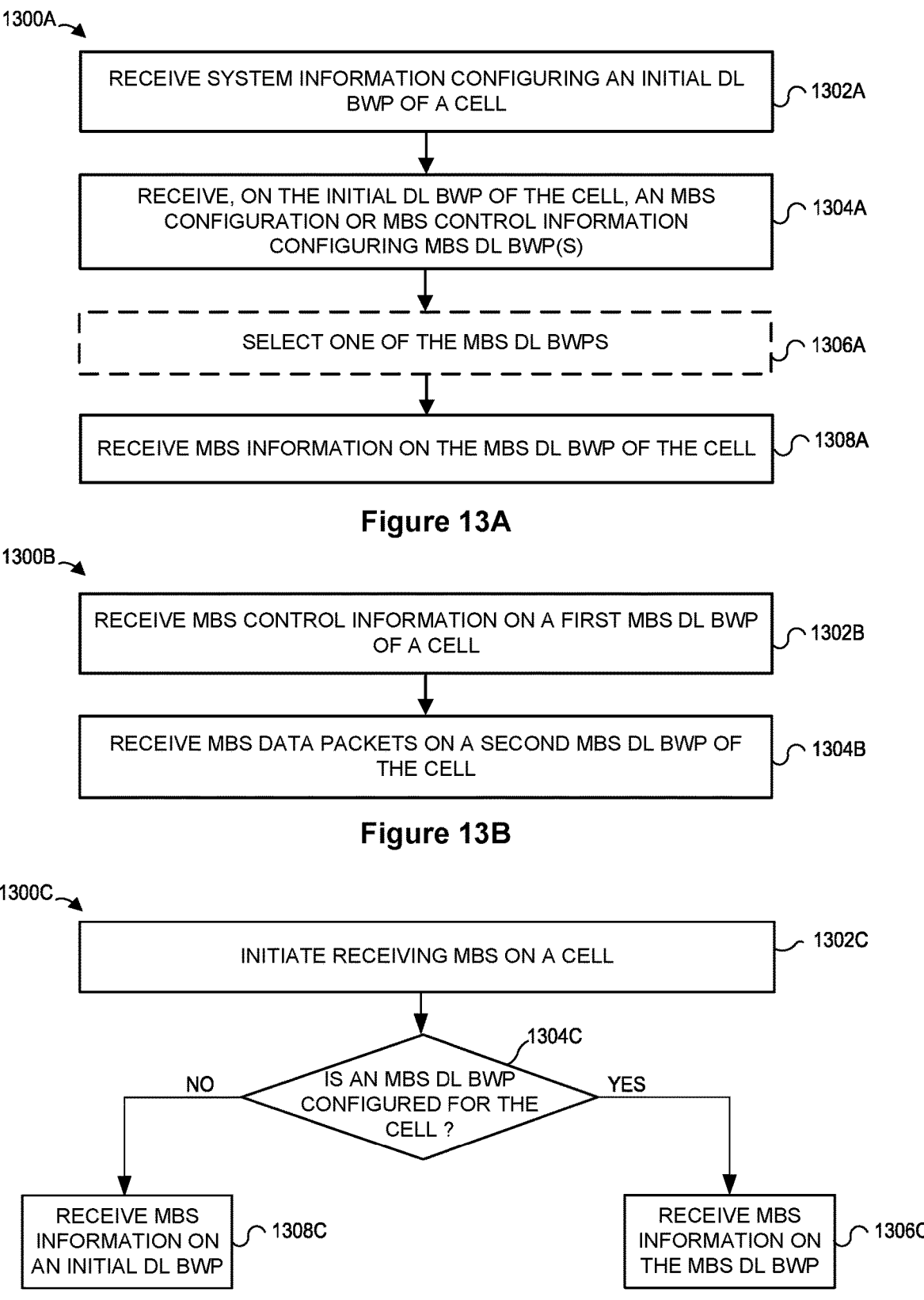
Figure 14D:
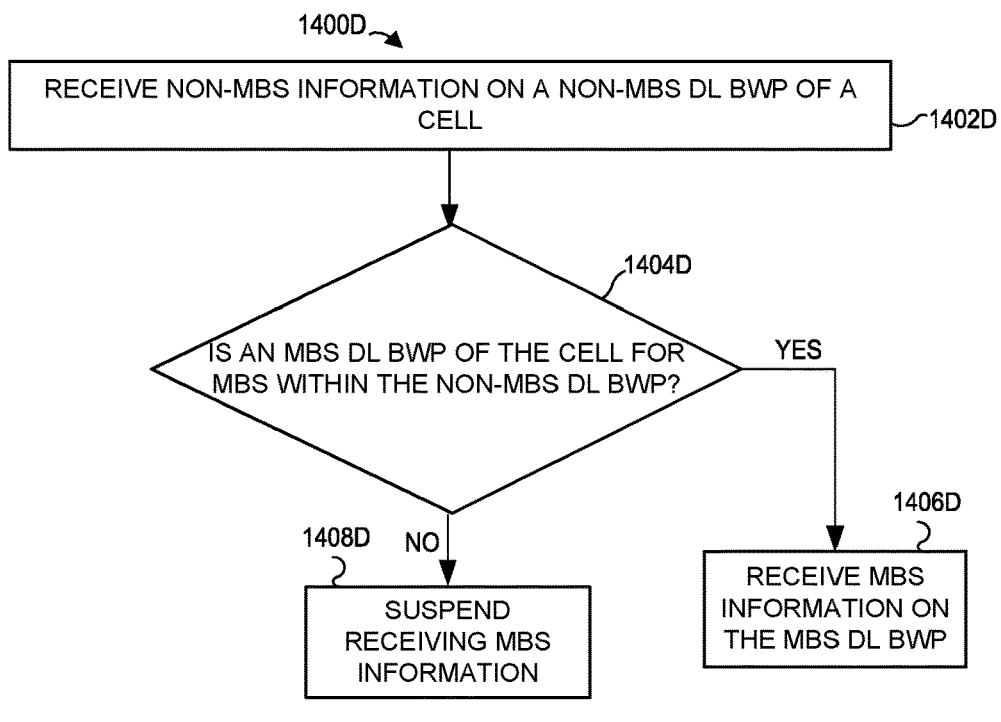
Figure 14E:
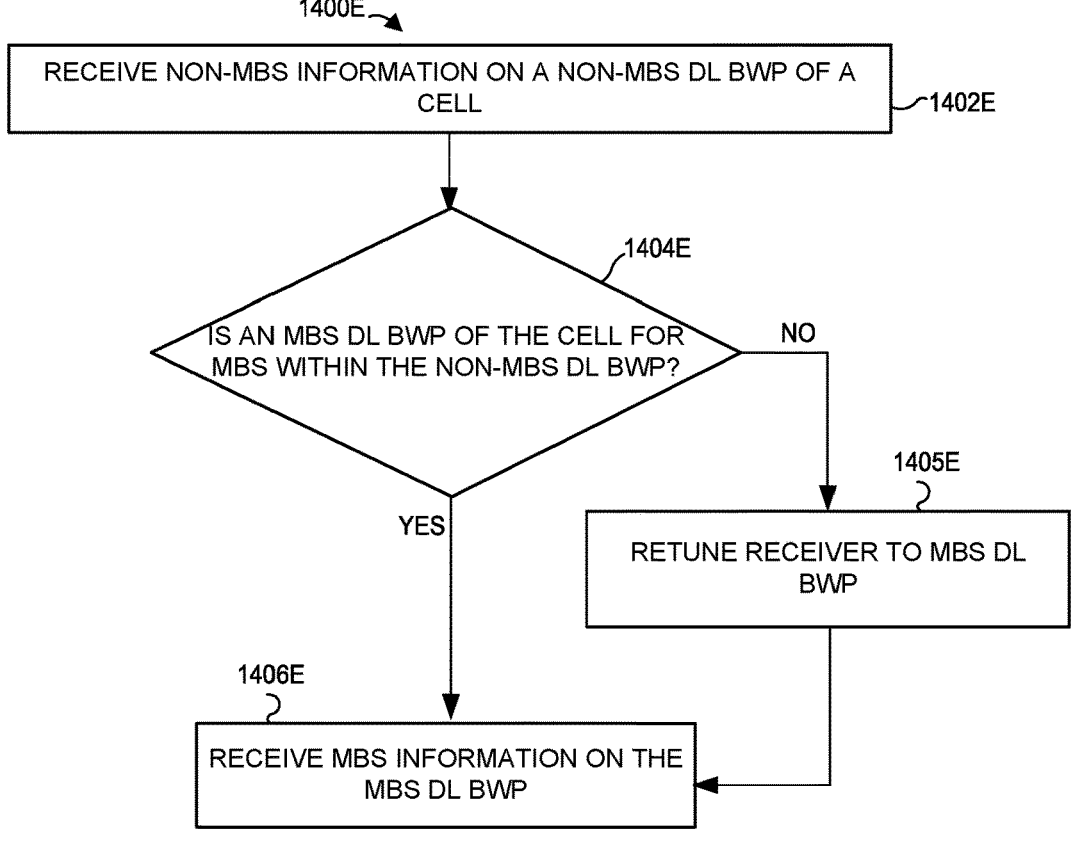

4 multicasting or broadcasting to UEs, at least one MBS BWP within the same bandwidth of the cell dedicated for multicasting or broadcasting MBS information to UEs, and UEs access the RAN via the cell;

FIG. 3B is a messaging diagram of an example scenario in which the base station of FIG. 1A configures an initial BWP within a bandwidth of a certain cell and at least one MBS BWP within the same bandwidth of the cell, and UEs communicate non-MBS information with the RAN while receiving MBS information on a downlink portion of the MBS BWP;

FIG. 3C is a messaging diagram of an example scenario in which the base station of FIG. 1A configures an initial BWP within a bandwidth of a certain cell and at least one MBS BWP within the same bandwidth of the cell, and UEs communicate non-MBS information with the RAN while the UEs suspend receiving MBS information on a downlink portion of the MBS BWP;

FIG. 4A schematically illustrates a configuration in which the narrower initial BWP is entirely within the wider MBS BWP;

FIG. 4B schematically illustrates a configuration in which the narrower MBS BWP is entirely within the wider initial BWP;

FIG. 4C schematically illustrates a configuration in which the MBS BWP is entirely within the initial BWP, and the initial BWP is entirely within the MBS BWP;

FIG. 4D schematically illustrates a configuration in which the initial BWP partially overlaps the MBS BWP;

FIG. 4E schematically illustrates a configuration in which the initial BWP and the MBS BWP do not overlap;

FIG. 4F schematically illustrates a configuration in which the base station of FIG. 1A configures a first MBS BWP and a second MBW BWP within the same bandwidth of the cell;

FIG. 5A is a messaging diagram of an example scenario in which a base station of FIG. 1B configures an initial BWP within a bandwidth of a certain cell, and at least one MBS BWP within the same bandwidth of the cell, and UEs access the RAN via the cell;

FIG. 5B is a messaging diagram of an example scenario in which a base station of FIG. 1B modifies a configuration of the MBS BWP;

FIG. 5C is a messaging diagram of an example scenario in which a base station of FIG. 1B stops transmitting MBS information to the UEs;

FIG. 6A is a flow diagram of an example method for transmitting MBS information to UEs on a downlink portion of the MBS BWP, which can be implemented in the base station of FIG. 1A;

FIG. 6B is a flow diagram of an example method for transmitting MBS control information to UEs on a downlink portion of the first MBS BWP, and MBS data packets to UEs on a downlink portion of the second MBS BWP, which can be implemented in the base station of FIG. 1A;

FIG. 6C is a flow diagram of an example method for transmitting both MBS control information and MBS data packets to UEs on a downlink portion of the same MBS BWP, which can be implemented in the base station of FIG. 1A;

FIG. 7A is a flow diagram of an example method for transmitting non-MBS information to UEs on a downlink portion of the initial BWP, and both MBS control information and MBS data packets to UEs on a downlink portion of the MBS BWP, which can be implemented in the base station of FIG. 1A;

FIG. 7B is a flow diagram of an example method for transmitting non-MBS information to UEs on a downlink portion of the initial BWP, MBS control information to UEs on a downlink portion of the first MBS BWP, and MBS data packets to UEs on a downlink portion of the second MBS BWP, which can be implemented in the base station of FIG. 1A;

FIG. 8 is a flow diagram of an example method for transmitting MBS data packets from a CU to UEs via a cell, which can be implemented in the base station of FIG. 1B;

FIG. 9 is a flow diagram of an example method for configuring UEs to receive MBS data packets from a CU via the DU, which can be implemented in the base station of FIG. 1B;

FIG. 10 is a flow diagram of an example method for sending new or updated MBS configuration(s) to a DU, which can be implemented in the base station of FIG. 1B;

FIG. 11 is a flow diagram of an example method for modifying previously allocated MBS radio resources and sending MBS data packet(s) received from a CU to UEs on the modified MBS radio resources, which can be implemented in the base station of FIG. 1B;

FIG. 12 is a flow diagram of an example method for releasing previously allocated MBS radio resources, which can be implemented in the base station of FIG. 1B;

FIG. 13A is a flow diagram of an example method for accessing a cell via MBS BWP(s) and receiving MBS information from a base station on a downlink portion of the MBS BWP(s), which can be implemented in a UE of FIG. 1A;

FIG. 13B is a flow diagram of an example method for receiving MBS control information on a downlink portion of a first MBS BWP, and MBS data packets on a downlink portion of a second MBS BWP, which can be implemented in a UE of FIG. 1A;

FIG. 13C is a flow diagram of an example method for receiving MBS information on a downlink portion of an initial BWP or an MBS BWP of a cell, depending on whether an MBS BWP is configured for the cell, which can be implemented in a UE of FIG. 1A;

FIG. 14A is a flow diagram of an example method for receiving MBS information while simultaneously communicating non-MBS information with a base station via a cell, which can be implemented in a UE of FIG. 1A;

FIG. 14B is a flow diagram of an example method for suspending receiving MBS information while communicating non-MBS information with a base station via a cell, which can be implemented in a UE of FIG. 1A;

FIG. 14C is a flow diagram of an example method for suspending receiving non-MBS information while communicating MBS information with a base station via a cell, which can be implemented in a UE of FIG. 1A;

FIG. 14D is a flow diagram of an example method for suspending receiving MBS information while receiving non-MBS information from a base station via a cell, if a downlink portion of an MBS BWP is entirely within a downlink portion of a non-MBS BWP, which can be implemented in a UE of FIG. 1A;

FIG. 14E is a flow diagram of an example method for receiving MBS information while receiving non-MBS information from a base station via a cell, by retuning its receiver if necessary, which can be implemented in a UE of FIG. 1A;

FIG. 15 is a flow diagram of an example method in which a base station of FIG. 1A configures BWPs in a certain cell, for access by UEs; and FIG. 16 is a flow diagram of an example method in which a UE of FIG. 1A accesses RAN via BWPs in a certain cell.

DETAILED DESCRIPTION OF THE DRAWINGS

Generally speaking, the techniques of this disclosure allow UEs to receive MBS information via a specific bandwidth part (BWP) allocated by a base station of a RAN. To this end, the base station can configure BWPs of different widths in one or multiple overlapping cells to multicast or broadcast ("multicast" or "broadcast" interchangeably referred to as "transmit") MBS data (and associated control information) and/or unicast ("unicast" interchangeably referred to as "transmit") non-MBS data (and associated control information) with one or multiple UEs on the downlink (DL). The one or more multiple UEs can transmit (i.e., unicast) non-MBS data to the base station on the uplink (UL).

FIG. 1A depicts an example wireless communication system 100 that can implement MBS operation techniques of this disclosure. The wireless communication system 100 includes UE 102A and UE 102B, as well as base stations 104, 106A, 106B of a radio access network (RAN) (e.g., RAN 105) that are connected to a core network (CN) 110. To ease readability, UE 102 is used herein to represent the UE 102A, the UE 102B, or both the UE 102A and UE 102B, unless otherwise specified. The base stations 104, 106A, 106B can be any suitable type, or types, of base stations, such as an evolved node B (eNB), a next-generation eNB (ng-eNB), or a 5G Node B (gNB), for example. As a more specific example, the base station 104 can be an eNB or a gNB, and the base stations 106A and 106B can be gNBs.

The base station 104 supports a cell 124, the base station 106A supports a cell 126A, and the base station 106B supports a cell 126B. The cell 124 partially overlaps with both of cells 126A and 126B, such that the UE 102 can be in range to communicate with base station 104 while simultaneously being in range to communicate with base station 106A or 106B (or in range to detect or measure the signal from both base stations 106A and 106B). The overlap can make it possible for the UE 102 to hand over between cells (e.g., from cell 124 to cell 126A or 126B) or base stations (e.g., from base station 104 to base station 106A or base station 106B) before the UE 102 experiences radio link failure, for example. Moreover, the overlap allows the various dual connectivity (DC) scenarios discussed below. For example, the UE 102 can communicate in DC with the base station 104 (operating as an MN) and the base station 106A (operating as an SN) and, upon completing a handover to base station 106B, can communicate with the base station 106B (operating as an MN). As another example, the UE 102 can communicate in DC with the base station 104 (operating as an MN) and the base station 106A (operating as an SN) and, upon completing an SN change, can communicate with the base station 104 (operating as an MN) and the base station 106B (operating as an SN).

More particularly, when the UE 102 is in DC with the base station 104 and the base station 106A, the base station 104 operates as a master eNB (MeNB), a master ng-eNB (Mng-eNB), or a master gNB (MgNB), and the base station 106A operates as a secondary gNB (SgNB) or a secondary ng-eNB (Sng-eNB).

In non-MBS (i.e., unicast) operation, the UE 102 can use a radio bearer (e.g., a DRB or an SRB) that at different times terminates at an MN (e.g., the base station 104) or an SN (e.g., the base station 106A). For example, after handover or SN change to the base station 106B, the UE 102 can use a radio bearer (e.g., a DRB or an SRB) that at different times terminates at the base station 106B. The UE 102 can apply one or more security keys when communicating on the radio bearer, in the UL (from the UE 102 to a base station) and/or DL (from a base station to the UE 102) direction. In the non-MBS operation, the UE 102 transmits data via the radio bearer on (i.e., within) an uplink BWP of a cell to the base station and/or receives data via the radio bearer on a DL BWP of the cell from the base station. The UL BWP can be an initial UL BWP or a dedicated UL BWP, and the DL BWP can be an initial DL BWP or a dedicated DL BWP. The UE 102 can receive paging, system information, public warning message(s) or a random access response on the DL BWP. In such non-MBS operation, the UE 102 can be in a connected state. Alternatively, the UE 102 can be in an idle or inactive state if the UE 102 supports small data transmission in the idle or inactive state.

In MBS operation, the UE 102 can use a radio bearer (e.g., an MBS radio bearer (MRB)) that at different times terminates at an MN (e.g., the base station 104) or an SN (e.g., the base station 106A). For example, after handover or SN change to the base station 106B, the UE 102 can use a radio bearer (e.g., an MRB) that at different times terminates at the base station 106B. In some implementations, the UE 102 can apply one or more security keys to decrypt data and/or check integrity of the data when receiving the data on the radio bearer, in the downlink (from a base station to the UE 102) direction. In other implementations, the UE 102 can apply no security key to data received on the radio bearer. In the MBS operation, the UE 102 receives MBS data (e.g., via the MRB) on an MBS DL BWP of a cell from a base station.

The base station 104 includes processing hardware 130, which can include one or more general-purpose processors (e.g., central processing units (CPUs)) and a computer-readable memory storing machine-readable instructions executable on the one or more general-purpose processor(s), and/or special-purpose processing units. The processing hardware 130 in the example implementation in FIG. 1A includes a base station MBS controller 132 that is configured to manage or control transmission of MBS data received from the CN 110 or an edge server. For example, the base station MBS controller 132 can be configured to support Radio Resource Control (RRC) configurations, procedures and messaging associated with MBS procedures, and/or to support the necessary operations, as discussed below. The processing hardware 130 can include a base station non-MBS controller 134 configured to manage or control one or more RRC configurations and/or RRC procedures when the base station 104 operates as an MN or SN during a non-MBS operation.

The base station 106A includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes a base station MBS controller 142 that is configured to manage or control transmission of MBS data received from the CN 110 or an edge server. For example, the base station MBS controller 142 can be configured to support RRC configurations, procedures and messaging associated with MBS procedures, and/or to support the necessary operations, as discussed below. The processing hardware 140 can include a base station non-MBS controller 144 configured to manage or control one or more RRC configurations and/or RRC procedures when the base station 106A operates as an MN or SN during a non-MBS operation. While not shown in FIG. 1A, the base station 106B can include processing hardware similar to the processing hardware 130 of the base station 104 or the processing hardware 140 of the base station 106A.

The UE 102 includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes a UE MBS controller 152 that is configured to manage or control reception of MBS data. For example, the UE MBS controller 152 can be configured to support RRC configurations, procedures and messaging associated with MBS procedures, and/or to support the necessary operations, as discussed below. The processing hardware 150 can include a UE non-MBS controller 154 configured to manage or control one or more RRC configurations and/or RRC procedures in accordance with any of the implementations discussed below, when the UE 102 communicates with an MN and/or a SN during a non-MBS operation.

The CN 110 can be an evolved packet core (EPC) 111 or a fifth-generation core (5GC) 160, both of which are depicted in FIG. 1A. The base station 104 can be an eNB supporting an S1 interface for communicating with the EPC 111, an ng-eNB supporting an NG interface for communicating with the 5GC 160, or a gNB that supports an NR radio interface as well as an NG interface for communicating with the 5GC 160. The base station 106A can be an EUTRA-NR DC (EN-DC) gNB (en-gNB) with an S1 interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104, 106A, and 106B can support an X2 or Xn interface.

Among other components, the EPC 111 can include a Serving Gateway (S-GW) 112, a Mobility Management Entity (MME) 114, and a Packet Data Network Gateway (P-GW) 116. The S-GW 112 is generally configured to transfer user-plane packets related to audio calls, video calls, Internet traffic, etc., and the MME 114 is configured to manage authentication, registration, paging, and other related functions. The P-GW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management (AMF) 164, and/or Session Management Function (SMF) 166. The UPF 162 is generally configured to transfer user-plane packets related to audio calls, video calls, Internet traffic, etc., the AMF 164 is configured to manage authentication, registration, paging, and other related functions, and the SMF 166 is configured to manage PDU sessions. The UPF 162, AMF 164 and/or the SMF 166 can be configured to support MBS. For example, the SMF 166 can be configured to manage or control MBS transport, configure the UPF 162 and/or RAN 105 for MBS flows, and/or manage or configure MBS session(s) or PDU Session(s) for MBS for UE 102. The UPF 162 is configured to transfer MBS data packets to audio, video, Internet traffic, etc. to the RAN 105. The UPF 162 and/or SMF 166 can be configured for both unicast service and MBS, or for MBS only.

Generally, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure can also apply to other suitable radio access and/or core network technologies such as sixth generation (6G) radio access and/or 6G core network or 5G NR-6G DC, for example.

In different configurations or scenarios of the wireless communication system 100, the base station 104 can operate as an MeNB, an Mng-eNB, or an MgNB, the base station 106B can operate as an MeNB, an Mng-eNB, an MgNB, an SgNB, or an Sng-eNB, and the base station 106A can operate as an SgNB or an Sng-eNB. The UE 102 can communicate with the base station 104 and the base station 106A or 106B via the same radio access technology (RAT), such as EUTRA or NR, or via different RATs.

When the base station 104 is an MeNB and the base station 106A is an SgNB, the UE 102 can be in EN-DC with the MeNB 104 and the SgNB 106A. When the base station 104 is an Mng-eNB and the base station 106A is an SgNB, the UE 102 can be in next generation (NG) EUTRA-NR DC (NGEN-DC) with the Mng-eNB 104 and the SgNB 106A. When the base station 104 is an MgNB and the base station 106A is an SgNB, the UE 102 can be in NR-NR DC (NR-DC) with the MgNB 104 and the SgNB 106A. When the base station 104 is an MgNB and the base station 106A is a Sng-eNB, the UE 102 can be in NR-EUTRA DC (NE-DC) with the MgNB 104 and the Sng-eNB 106A.

FIG. 1B depicts an example, distributed implementation of any one or more of the base stations 104, 106A, 106B. In this implementation, the base station 104, 106A, or 106B includes a centralized unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as an MN or an SN. The process hardware can also include a physical layer controller configured to manage or control one or more physical layer operations or procedures.

In some implementations, the CU 172 can include a logical node CU-CP 172A that hosts the control plane part of the Packet Data Convergence Protocol (PDCP) protocol of the CU 172 and/or radio resource control (RRC) protocol of the CU 172. The CU 172 can also include logical node(s) CU-UP 172B that hosts the user plane part of the PDCP protocol and/or Service Data Adaptation Protocol (SDAP) protocol of the CU 172. The CU-CP 172A can transmit the non-MBS control information and MBS control information, and the CU-UP 172B can transmit the non-MBS data packets and MBS data packets, as described herein.

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. The CU-CP 172A can be connected to one or more DU 174s through an F1-C interface. The CU-UP 172B can be connected to one or more DU 174 through the F1-U interface under the control of the same CU-CP 172A. In some implementations, one DU 174 can be connected to multiple CU-UP 172B under the control of the same CU-CP 172A. In such implementations, the connectivity between a CU-UP 172B and a DU 174 is established by the CU-CP 172A using Bearer Context Management functions.

Figure 2:
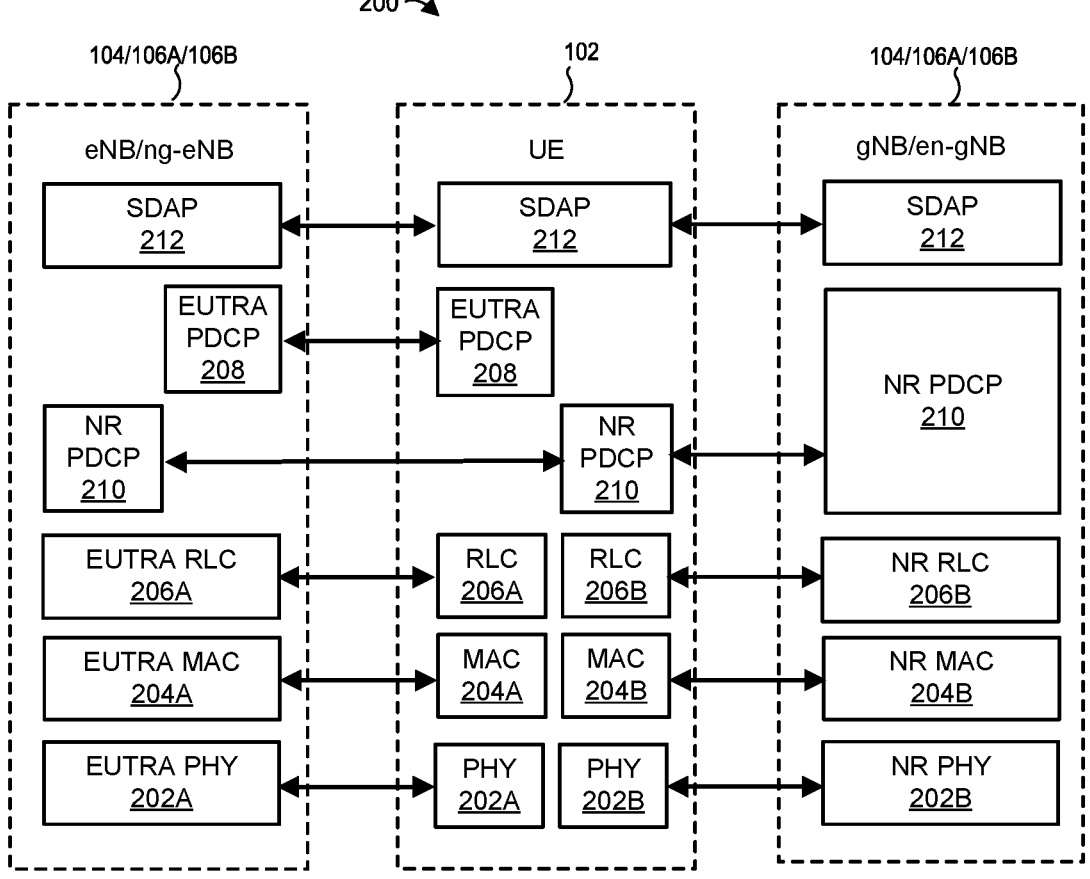
FIG. 2 is a block diagram of an example protocol stack, according to which each of the UEs of FIG. 1A can communicate with base stations of FIG. 1A.

FIG. 2 illustrates, in a simplified manner, an example protocol stack 200 according to which the UE 102 can communicate with an eNB/ng-eNB or a gNB (e.g., one or more of the base stations 104, 106A, 106B).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A, and an SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 can be SDAP PDUs, Internet Protocol (IP) packets or Ethernet packets.

In scenarios where the UE 102 operates in EN-DC with the base station 104 operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can be an SRB or a DRB.

In some implementations, a base station (e.g., base station 104, 106A or 106B) broadcasts MBS data packets (e.g., including application content such as text, voice or video packets) via one or more MBS radio bearers (MRB(s)), and in turn the UE 102 receives the MBS data packets via the MRB(s). The base station can include configuration(s) of the MRB(s) in MBS control information described below. In some implementations, the base station broadcasts the MBS data packets via RLC sublayer 206, MAC sublayer 204, and PHY sublayer 202, and correspondingly, the UE 102 uses PHY sublayer 202, MAC sublayer 204, and RLC sublayer 206 to receive the MBS data packets. In such implementations, the base station and the UE 102 may not use PDCP sublayer 208 and a SDAP sublayer 212 to communicate the MBS data packets. In other implementations, the base station broadcasts the MBS data packets via PDCP sublayer 208, RLC sublayer 206, MAC sublayer 204, and PHY sublayer 202, and correspondingly, the UE 102 uses PHY sublayer 202, MAC sublayer 204, RLC sublayer 206 and PDCP sublayer 208 to receive the MBS data packets. In such implementations, the base station and the UE 102 may not use a SDAP sublayer 212 to communicate the MBS data packets. In yet other implementations, the base station broadcasts the MBS data packets via the SDAP sublayer 212, PDCP sublayer 208, RLC sublayer 206, MAC sublayer 204 and PHY sublayer 202, and correspondingly, the UE 102 uses PHY sublayer 202, MAC sublayer 204, RLC sublayer 206, PDCP sublayer 208, and the SDAP sublayer 212 to receive the MBS data packets.

FIG. 3A corresponds to a scenario in which a base station can allocate MBS DL BWP(s), so that the base station can transmit MBS information (e.g., MBS control information, MBS data packets) to a UE. FIG. 3B corresponds to scenarios in which a UE can receive MBS data packets while simultaneously communicating non-MBS data, non-MBS control signals, or other suitable non-MBS information with the base station. FIG. 3C corresponds to scenarios in which a UE suspends receiving MBS information (i.e., MBS data packets and MBS control information) while communicating non-MBS data, non-MBS control signals, or other suitable non-MBS information with the base station. While FIGS. 3A-3C and the accompanying descriptions refer specifically to the UE 102 and base stations 104 of FIG. 1 supporting 5G capabilities, it is understood that the following techniques may be implemented by other components and/or in systems other than the wireless communication system 100 of FIG. 1A to support other technologies, such as 6G radio access and/or 6G core network, for example.

Now referring to a scenario 300A illustrated in FIG. 3A, the UE 102 initially operates in idle state or inactive state (e.g., RRC IDLE state, RRC INACTIVE state), or more generally in a state in which there is no active radio connection between the UE 102 and the base station 104. Alternatively, the UE 102 initially operates in connected state (e.g., RRC CONNECTED state), or more generally in a state in which there is an active radio connection between the UE 102 and the base station 104.

The base station 104 generates an initial downlink (DL) BWP configuration for cell 124 including an initial DL BWP where the base station 104 can transmit non-MBS data and/or non-MBS DL control signals to the UE 102. The DL non-MBS data includes system information (e.g., system information at event 302), a paging, a random access response, a MAC protocol data unit (PDU), an RLC PDU, a PDCP PDU, and/or an RRC PDU. The non-MBS DL control signals can include DL control information (DCI) commands. The base station 104 also generates an initial uplink (UL) BWP configuration for cell 124 including an initial UL BWP where the UE 102 can transmit UL non-MBS data and/or UL non-MBS control signals to the base station 104. For example, the UL non-MBS data includes a MAC PDU, an RLC PDU, a PDCP PDU, and/or an RRC PDU. The UL non-MBS control signals include random access preamble(s), hybrid automatic repeat request (HARQ) acknowledgement (ACK), HARQ negative acknowledgement (NACK), channel state information (CSI), and/or sounding reference signal(s). The base station 104 can allocate the initial DL BWP of the cell 124 within the DL bandwidth 400 of the cell 124, as discussed in more detail below with reference to FIGS. 4A-F. Similarly, the base station 104 can allocate the initial UL BWP of the cell 124 within the UL bandwidth of the cell 124. The DL and UL bandwidths can be overlapped on a carrier frequency belonging to a time division duplex (TDD) frequency band, or non-overlapped on a carrier frequency belonging to a frequency division duplex (FDD) frequency band.

After allocating the initial DL BWP and initial UL BWP, the base station 104 transmits 302, to the UE 102 via the cell 124, system information, including the initial DL BWP configuration and initial UL BWP configuration. In some implementations, the system information 302 can include a system information block (SIB) that includes both the DL BWP configuration and UL BWP configuration. In other implementations, the system information 302 can include separate SIBs that include the respective DL BWP configuration and UL BWP configuration.

In some implementations, the base station 104 can allocate a dedicated DL BWP of the cell 124 within the DL bandwidth of the cell 124, and a dedicated UL BWP of the cell 124 within the UL bandwidth of the cell 124, as discussed in more detail below with reference to FIGS. 4A-F. The dedicated DL/UL BWP can include the initial DL/UL BWP, partially overlap with the initial DL/UL BWP, or not overlap with the initial DL/UL BWP. The base station 104 can allocate the dedicated DL/UL BWP in accordance with the bandwidth capability of a particular UE 102 (e.g., UE 102A or UE 102B), so that the dedicated DL/UL BWP does not exceed the bandwidth capability of the particular UE 102. In such implementations, a particular UE 102 (e.g., UE 102A or UE 102B) can receive, from the base station 104 on the initial DL BWP, RRC message(s) including a configuration of a dedicated DL BWP and/or a configuration of the dedicated UL BWP.

In some implementations, the UE 102 can receive a first RRC message from the base station 104 on the initial DL BWP that includes configurations for both the dedicated DL/UL BWP. In other implementations, the UE 102 can receive the first RRC message from the base station 104 on the initial DL BWP that includes a configuration for only the dedicated UL BWP. In such an implementation, the UE 102 can transmit, to the base station 104, a second RRC message responsive to the first message on the dedicated UL BWP or the initial UL BWP. In some implementations, the UE 102 can receive the first RRC message from base station 106B on a DL BWP and transmit the second RRC message to the base station 104 on the initial UL BWP or the dedicated UL BWP, e.g., when performing handover from the base station 106B to the base station 104.

In some implementations, the first RRC message is an RRC Setup, RRC Resume, RRC Reestablishment, or RRC Reconfiguration message, and the second RRC message is an RRC Setup Complete, RRC Resume Complete, RRC Reestablishment Complete, or RRC Reconfiguration Complete message. The UE 102 can transition to RRC CONNECTED (or, more generally, a state in which the UE 102 has an active radio connection with the base station 104) in response to the RRC Setup Complete or RRC Resume Complete.

In some implementations, the base station 104 can assign a physical cell identity (PCI) to cell 124. In some implementations, the base station 104 transmits a synchronization signal (SS) associated with the PCI, which the UE 102 can use for downlink slot or frame synchronization. In some implementations, the base station 104 can transmit, on a physical broadcast channel (PBCH), a master information block (MIB) including a physical downlink control channel (PDCCH) configuration (hereinafter a "first PDCCH configuration"). For example, the first PDCCH configuration can be a PDCCH-ConfigSIB1 information element (IE) for cell 124. In some implementations, the base station 104 transmits 302 the system information according to the first PDCCH configuration, and the UE 102 receives 302 the system information according to the first PDCCH configuration.

In some implementations, the first PDCCH configuration configures a control resource set (CORESET) (e.g., CORESET #0) and a search space (e.g., search space #0), and the base station 104 can configure a locationAndBandwidth field configuring the initial DL BWP so that the initial DL BWP contains the entire CORESET of cell 124 in the frequency domain. The base station 104 generates a DCI command configuring physical downlink shared channel (PDSCH) resources, and broadcasts the DCI command on a PDCCH on radio resources configured by the CORESET and search space, and then broadcasts 302 the system information on the PDSCH radio resources. In turn, the UE 102 receives the DCI command on the PDCCH on radio resources configured by the CORESET and search space, and then receives 302 the system information on the PDSCH radio resources configured by the DCI command. In some implementations, the base station 104 broadcasts 302 the system information on a bandwidth of the CORESET. In other implementations, the base station 104 broadcasts 302 the system information on the initial DL BWP.

In some implementations, the base station 104 can allocate an MBS DL BWP of the cell 124 (hereinafter a "first MBS DL BWP") within the DL bandwidth of the cell 124, as discussed in more detail below with reference to FIGS. 4A-F, so that the base station 104 can transmit 306 MBS control information within the first MBS DL BWP. The first MBS DL BWP can overlap (or alternatively not overlap) with the initial DL BWP described in event 302 (i.e., a width of the first MBS DL BWP can be larger than, equal to, or smaller than a width of the initial DL BWP). In some implementations, the base station 104 can transmit 306 MBS control information within the initial DL BWP. In some implementations, in addition to the first MBS DL BWP, the base station 104 can allocate another MBS DL BWP of the cell 124 (hereinafter a "second MBS DL BWP") within the DL bandwidth of the cell 124, as illustrated in FIG. 4F, so that the base station 104 can transmit 308 MBS data packets (e.g., including audio, video and/or text contents) within the second MBS DL BWP. The second MBS DL BWP (e.g., second MBS DL BWP 414F) can overlap (or alternatively not overlap, as shown in FIG. 4F) with the first MBS DL BWP (e.g., first MBS DL BWP 412F) (i.e., a width of the second MBS DL BWP can be larger than, equal to, or smaller than a width of the first MBS DL BWP). In some implementations, rather than allocating the first MBS DL BWP for transmitting MBS control information and the second MBS DL BWP for transmitting MBS data packets, the base station 104 can allocate only the first MBS DL BWP (i.e., and not the second MBS DL BWP) for transmitting both the MBS control information and MBS data packets at events 306 and 308, respectively. In other implementations, the base station 104 can allocate only the second MBS DL BWP (i.e., and not the first MBS DL BWP) for transmitting both the MBS control information and MBS data packets at events 306 and 308, respectively.

In the implementations described above, the base station 104 can generate one or more MBS configuration, such as first MBS configuration(s) (e.g., including a first MBS DL BWP configuration corresponding to the first MBS DL BWP) and second MBS configuration(s) (e.g., including a second MBS DL BWP configuration corresponding to the second MBS DL BWP), as applicable, and in turn transmit 304 the MBS configuration(s) to the UE 102 on the initial DL BWP. Upon receiving the MBS configuration(s), the UE 102 is enabled to receive MBS control information and MBS data packets from the base station 104. As such, after allocating the first and/or second MBS DL BWP as described above, the base station 104 transmits 308 the MBS data packets on the first or second MBS DL BWP, and in turn, the UE 102 receives the MBS data packets on the first or second MBS DL BWP. In some implementations, the base station 104 may neither allocate the first MBS DL BWP nor the second MBS DL BWP. In such implementations, the base station 104 can transmit the MBS control information and MBS data packets on the initial DL BWP at events 306 and 308, respectively, and in turn, the UE 102 can receive the MBS control information and MBS data packets on the initial DL BWP.

In some implementations, the base station 104 transmits 304 system information, including both the first MBS configuration(s) and the second MBS configuration(s), to the UE 102. In other implementations, the base station 104 transmits 304 system information, including the first MBS configuration(s), to the UE 102, and transmits 306 MBS control information, including the second MBS configuration(s), to the UE 102. In some implementations, the system information 304 can include SIB(s) including the first MBS configuration(s) and/or the second MBS configuration(s). In such implementations, the SIB(s) included in the system information at event 304 and the SIB included in the system information at event 302 can be the same SIB or different SIBs. In turn, the UE 102 receives 304 the system information on the initial DL BWP. In some implementations, the UE 102 can receive 304 the system information according to the first PDCCH configuration, similar to receiving 302 the system information as described above. In other implementations, the system information at event 302 includes another PDCCH configuration (hereinafter a "second PDCCH configuration"), which configures common or UE specific PDCCH parameters such as CORESET(s), search space(s) and/or additional parameter(s) for the UE 102 to acquire a PDCCH. In such implementations, the UE 102 can receive 304 the system information according to the second PDCCH configuration.

In some implementations, the first MBS configuration(s) includes at least one multicast control channel (MCCH) configuration to configure a respective MCCH. In some implementations, the MCCH configuration may configure a modification period, an offset, a repetition period, a slot configuration indicating slots which may carry an MCCH, and/or a modulation and coding scheme (MCS) indicating an MCS applicable for slot(s) indicated by the slot configuration. The slot configuration may include a bitmap, one or more slot numbers, or a slot number and a duration to indicate the slot(s) which can be contiguous or non-contiguous. In these implementations, the base station 104 can transmit, to the UE 102, 306 MBS control information on the MCCH. In some implementations, the UE 102 may use the slot configuration together with the repetition period and/or offset to determine slots which can carry an MCCH. In other implementations, the UE 102 can use the slot configuration to determine slots which can carry an MCCH without using the repetition period and/or offset. In some implementations, the first MBS configuration(s) or the MCCH configuration may include a repetition number indicating a maximum number of repetitions in which the base station 104 transmits the same MBS control information or the same MCCH for extending coverage of the MBS. In some scenarios and implementations, the UE 102 (e.g., in a very weak-signal coverage such as in a basement when far from the base station 104) may receive the maximum number of repetitions of the same MBS control information or the same MCCH to obtain the MBS control information. In other scenarios and implementations, the UE 102 may receive a particular number (e.g., between one and the maximum number) of repetitions of the same MBS control information or the same MCCH to obtain the MBS control information.

In some implementations, the first MBS configuration(s) includes at least one single frequency network (SFN) area configuration. In some cases, the SFN can be a multicast broadcast SFN, a multimedia broadcast multicast service (MBMS) SFN, or MBS SFN (abbreviated as MBSFN). Each of the SFN area configuration(s) can include an SFN area identity identifying a specific SFN area, and/or an MCCH configuration configuring an MCCH. The base station 104 can transmit MBS control information for a specific SFN area on an MCCH.

In some implementations, the first MBS configuration(s) includes a third PDCCH configuration which configures common or UE specific PDCCH parameters such as CORESET(s), search space(s) and/or additional parameter(s) for the UE 102 to acquire a PDCCH. In some implementations, the first MBS DL BWP configuration includes the third PDCCH configuration. In these implementations, the third PDCCH configuration can be an existing IE (e.g., PDCCH-Config, PDCCH-ConfigCommon) defined in 3GPP specification 38.331. In other implementations, the third PDCCH configuration can be a new IE specifically defined for the UE 102 to receive MBS and/or other messages such as paging, commercial mobile alert system (CMAS) messages or Earthquake and Tsunami Warning System (ETWS) messages. The UE 102 can receive DCI command(s) on a PDCCH configured by the third PDCCH configuration. The UE 102 receives MCCH(s) and/or multicast traffic channel(s) (MTCH(s)) according to the DCI command(s). The base station 104 can transmit MBS data packets on the MTCH(s). The base station 104 transmits the MCCH(s) and/or MTCH(s) on radio resources within the first MBS DL BWP or the initial DL BWP in the frequency domain and the base station 104 can configure/indicate the radio resources in the DCI command(s). The base station 104 can also configure/indicate an MCS in each of the DCI command(s). The UE 102 uses the MCS to decode the PDSCH to obtain a MAC PDU and obtains the MCCH(s) and/or MTCH(s) from the MAC PDU. In one implementation, the UE 102 does not transmit HARQ feedback to the base station 104.

In some implementations, the base station 104 may generate a cyclic redundancy check (CRC) for each of the DCI command(s) and scramble the CRC with a specific radio network temporary identifier (RNTI) (e.g., MBS-RNTI), and transmit, to the UE 102, the DCI command(s) with the scrambled CRC on the PDCCH. The UE 102 receives the DCI command(s) and its scrambled CRC and verifies the scrambled CRC with the specific RNTI and the DCI command. If the UE 102 verifies the scrambled CRC as correct, the UE 102 receives MCCH(s) and/or MTCH(s) according to the DCI command(s). Otherwise, the UE 102 discards the DCI command. In one implementation, the base station 104 configures a value of the specific RNTI, e.g., in the first MBS configuration(s). In another implementation, the value of the specific RNTI is specified in a 3GPP specification. In some implementations, multiple RNTIs can be used for MCCH(s) and/or MTCH(s). For example, the base station 104 can use a first RNTI to transmit MCCH(s) and use a second RNTI to transmit MTCH(s).

In some implementations, the second MBS configuration(s) include configuration(s) similar to those in the first MBS configuration(s). For example, the second MBS configuration(s) may include a fourth PDCCH configuration similar to the third PDCCH configuration described above. The CORESETs and search spaces in at least two of the first, second, third, and fourth PDCCH configurations may partially overlap or alternatively, not overlap.

In some implementations, the second MBS configuration(s) include at least one MTCH configuration to configure MTCH(s). In other implementations, the second MBS configuration(s) includes physical layer configuration parameters where the base station 104 uses to transmit the MBS data packets on the MTCH(s). For example, the base station 104 may configure a physical multicast channel (PMCH) in the physical configuration parameters and transmit the MTCH(s) on the PMCH. The second MBS configuration(s) may include an MCS configuration configuring an MCS for the UE 102 to decode the PMCH carrying the MTCH(s).

In some implementations, the second MBS configuration(s) can include MBS session information. The MBS session information may include at least one temporary Mobile Group Identity (TMGI) and/or at least one session identity/identifier (ID). The TMGI(s) may be associated to a respective session ID. For example, the MBS session information may be formatted as a list which includes at least one entry consisting of a respective TMGI and session ID. The base station 104 may receive the MBS session information from the CN 110 (e.g., AMF 164, SMF 166 or UPF 162).

In some implementations, the second MBS configuration(s) can include a list of neighbour cells allocated with MBS DL BWP(s).

In some implementations, the first or second MBS configuration(s) can include discontinuous (DRX) configuration parameters for the MCCH(s)/MTCH(s). The UE 102 can use the DRX configuration parameters to perform a DRX operation such as managing its receiver (e.g., wake up the receiver to receive the MCCH(s)/MTCH(s), or sleep).

In some implementations, the base station 104 transmits 306 an RRC message including the MBS control information on the initial DL BWP or the first MBS DL BWP (or the second MBS DL BWP if the base station 104 does not allocate the first MBS DL BWP). In some implementations, the base station 104 configures an MCCH and signals the RRC message on the MCCH for each SFN area configured in the SIB at event 304. The UE 102 can receive the RRC message on the MCCH on the initial DL BWP, the first MBS DL BWP, or the second MBS DL BWP. The UE 102 can receive 306 the RRC message according to the first, second, third PDCCH configuration, or fourth PDCCH configuration, similar to receiving 302 the system information according to the first PDCCH as described above. In some implementations, the RRC message can be an MBSFNAreaConfiguration message or SCPTMConfiguration message.

In some implementations, the base station 104 periodically broadcasts the system information at events 302, 304 and/or the MBS control information at event 306.

FIG. 3B illustrates a scenario 300B similar to the scenario 300A of FIG. 3A, but in which the UE 102 can receive MBS data packets while simultaneously communicating non-MBS information (i.e., non-MBS data and/or non-MBS control signals) with the base station 104. As in FIG. 3A, the base station 104 transmits 302, to the UE 102 via the cell 124, system information, including the initial DL BWP configuration and initial UL BWP configuration. In some implementations, the base station 104 also sends, to the UE 102, RRC message(s) including a configuration of a dedicated DL BWP and/or a configuration of the dedicated UL BWP, as described above in scenario 300A. The base station 104 then transmits 304 the MBS configuration(s) to the UE 102 on the initial DL BWP. The base station 104 then transmits 306 MBS control information on the initial DL BWP or the first MBS DL BWP (or the second MBS DL BWP if the base station 104 does not allocate the first MBS DL BWP), and transmits 308 MBS data packets on the first MBS DL BWP or second MBS DL BWP.

As depicted in scenario 300B, assuming that the UE 102 is capable of receiving MBS information, the UE 102 communicates 310 non-MBS data, non-MBS control signals, or other suitable non-MBS information (e.g., random access response, paging, system information, CMAS or ETWS) with the base station 104 on a DL BWP (i.e., initial DL BWP, dedicated DL BWP, first MBS DL BWP, or second MBS DL BWP) and a UL BWP (i.e., initial UL BWP or dedicated UL BWP) while receiving MBS data packets on the first or second MBS DL BWP. In some implementations, the UE 102 communicates 310 non-MBS data, non-MBS control signals, or other suitable non-MBS information with the base station 104 on a DL BWP and a UL BWP while receiving the MBS control information on the initial DL BWP or the first MBS DL BWP.

For example, with reference to FIG. 4A, if the UE 102 is initially tuned to MBS DL BWP 412A, the UE 102 can simultaneously receive non-MBS information on the initial/dedicated DL BWP 402A and MBS data packets on the first or second MBS DL BWP (i.e., MBS DL BWP 412A), because the initial/dedicated DL BWP 402A is entirely within the MBS DL BWP 412A. Thus, the UE 102 need not retune from the MBS DL BWP 412A to the initial/dedicated DL BWP 402A. If the UE 102 is initially tuned to the initial/dedicated DL BWP 402A, the UE 102 may not simultaneously receive non-MBS information on the initial/dedicated DL BWP 402A and MBS data packets on the MBS DL BWP 412A, because the initial/dedicated DL BWP 402A is not entirely within the MBS DL BWP 412A. In this scenario, the UE 102 can retune its receiver (e.g., radio frequency (RF) chip/chipset and/or baseband chip/chipset) to switch from the initial/dedicated DL BWP 402A to the MBS DL BWP 412A, so that the UE 102 may simultaneously receive non-MBS information on the initial/dedicated DL BWP 402A and MBS data packets on the MBS DL BWP 412A. In some implementations, the UE 102 can retune its receiver in response to receiving the first RRC message configuring the dedicated DL BWP 402A. After retuning to the MBS DL BWP 412A, the UE 102 can still receive non-MBS information on the initial/dedicated DL BWP 402A because the initial/dedicated DL BWP 402A is entirely within the MBS DL BWP 412A.

As another example, with reference to FIG. 4B, if the UE 102 is initially tuned to initial/dedicated DL BWP 402B, the UE 102 can simultaneously receive non-MBS information on the initial/dedicated DL BWP 402B and MBS data packets on the MBS DL BWP 412B, because the MBS DL BWP 412B is entirely within the initial/dedicated DL BWP 402B. Thus, the UE 102 need not retune from the initial/ dedicated DL BWP 402B to the MBS DL BWP 412B. If the UE 102 is initially tuned to the MBS DL BWP 412B, the UE 102 may not simultaneously receive non-MBS information on the initial/dedicated DL BWP 402B and MBS data packets on the MBS DL BWP 412B, because the initial/ dedicated DL BWP 402B is wider than the MBS DL BWP 412B. In this scenario, the UE 102 can retune its receiver to switch from the MBS DL BWP 412B to the initial/dedicated DL BWP 402B, so that the UE 102 may simultaneously receive non-MBS information on the initial/dedicated DL BWP 402B and MBS data packets on the MBS DL BWP 412B. In some implementations, the UE 102 can retune its receiver in response to receiving the first RRC message configuring the dedicated DL BWP 402B. After retuning to the initial/dedicated DL BWP 402B, the UE 102 can still receive MBS data packets on the MBS DL BWP 412B because the MBS DL BWP 412B is entirely within the initial/dedicated DL BWP 402B.

As another example, with reference to FIG. 4C, if the UE 102 is initially tuned to initial/dedicated DL BWP 402C, the UE 102 can simultaneously receive non-MBS information on the initial/dedicated DL BWP 402C and MBS data packets on the MBS DL BWP 412C, because the MBS DL BWP 412B is entirely within the initial/dedicated DL BWP 402B. If the UE 102 is initially tuned to the MBS DL BWP 412C, the UE 102 may still simultaneously receive non-MBS information on the initial/dedicated DL BWP 402C and MBS data packets on the MBS DL BWP 412C, because the MBS DL BWP 412C is entirely within the initial/ dedicated DL BWP 402C. In this example, the UE 102 need not retune its receiver to switch from the MBS DL BWP 412C to the initial/dedicated DL BWP 402C, or from the initial/dedicated DL BWP 402C to the MBS DL BWP 412C, as the MBS DL BWP 412C and the initial/dedicated DL BWP 402C are the same BWPs.

As such, if the UE 102 is initially tuned to the wider BWP (i.e., MBS DL BWP 412A, initial/dedicated DL BWP 402B, or either of initial/dedicated DL BWP 402C or MBS DL BWP 412C), the UE 102 can simultaneously receive non-MBS information and MBS data packets. Furthermore, the UE 102 can save power by not retuning from the narrower BWP (i.e., initial/dedicated DL BWP 402A, MBS DL BWP 412B) to the wider BWP.

Although the initial/dedicated BWP 402A, 402B, and 402C and MBS DL BWP 412A, 412B, and 412C in respective FIGS. 4A, 4B, and 4C are each narrower than the entire DL bandwidth 400 of the cell 124, in some implementations, the initial/dedicated BWP 402A, 402B, and 402C and MBS DL BWP 412A, 412B, and 412C can span the entire DL bandwidth 400 of the cell 124.

As another example, with reference to FIG. 4D in which the MBS DL BWP 412D partially overlaps with the initial/ dedicated BWP 402D, and FIG. 4E in which the MBS DL BWP 412E does not overlap with the initial/dedicated BWP 402E, if the UE 102 is initially tuned to initial/dedicated DL BWP 402D or 402E, the UE 102 can retune to a virtual DL BWP including the initial/dedicated BWP 402D or 402E and MBS DL BWP 412D or 412E, to simultaneously receive non-MBS information on the initial/dedicated DL BWP 402D or 402E and MBS data packets on the MBS DL BWP 412D or 412E. In some implementations, the UE 102 can retune its receiver to receive the virtual DL BWP in response to receiving the first RRC message configuring the dedicated DL BWP 402B.

In some implementations, the UE 102 can initiate (e.g., activate) receiving MBS data packets before or after receiving the system information at events 302 or 304. If the UE 102 initiates receiving MBS data packets, the UE 102 at a later time can deactivate (e.g., stop) receiving MBS data packets. Thus, the UE 102 does not attempt to receive the MBS control information (and any subsequent updated MBS control information) at event 306, and may or may not attempt to receive the system information (and any subsequent updated system information) at event 304. After or while the UE 102 deactivates receiving MBS data packets, the UE 102 may switch from the first, second, or virtual MBS DL BWP to the initial/dedicated DL BWP. If the first or second MBS DL BWP is wider than the initial/dedicated DL BWP, the UE 102 may retune to the initial/dedicated DL BWP, and thus can save power. In one implementation, the UE 102 may retune immediately after the UE 102 deactivates receiving MBS data packets. In another implementation, the UE 102 retunes a predetermined time after which the UE 102 deactivates receiving MBS data packets. In some implementations, the UE 102 may not retune after the UE 102 deactivates receiving MBS data packets, to avoid frequently retuning back and forth between the initial/dedicated DL BWP and the first or second MBS DL BWP, for example.

In some implementations, event 310 includes a random access procedure. For example, the UE 102 transmits 310 a random access preamble or a message A to the base station 104 on the UL BWP in the random access procedure. In response, the base station 104 transmits 310 a random access response or message B to the UE 102 on the DL BWP. In other implementations, the UE 102 receives a PDCCH, a PDSCH, or DL PDUs specific for the UE 102 from the base station 104 at event 310. The DL PDUs can be PDCP PDUs associated to an SRB or a DRB. In yet other implementations, the UE 102 transmits a PUSCH, a PUCCH, a sounding reference signal (SRS), or UL PDUs to the base station 104 at event 310. The UL PDUs can be PDCP PDUs associated to an SRB or a DRB.

In some implementations, the UE 102 can perform measurements on reference signal(s) while receiving MBS data packets on the first or second MBS DL BWP. In other implementations, the UE 102 can suspend measurements on reference signal(s) while receiving MBS data packets on the first or second MBS DL BWP. In yet other implementations, the UE 102 can suspend receiving MBS data packets on the first or second MBS DL BWP while performing measurements on reference signal(s). In yet other implementations, the UE 102 can suspend receiving MBS data packets in measurement gap(s) while performing measurements in the measurement gap(s).

In some implementations, the measurements can include intra-frequency, inter-frequency and/or inter-RAT measurements. In some implementations, the reference signal(s) include primary synchronization signal (PSS), secondary synchronization signal (SSS), synchronization signal/PBCH block (SSB), channel state information (CSI) reference signal(s) and/or positioning reference signal(s).

In some implementations, the UE 102 (i.e., both the UE 102A and UE 102B) may support simultaneously receiving non-MBS information and MBS data packets on the initial/ dedicated DL BWP and the MBS DL BWP in FIGS. 4A-4F. In other implementations and scenarios, some but not all UEs (e.g., UE 102B) may support simultaneously receiving non-MBS information and MBS data packets on the initial/ dedicated DL BWP and the MBS DL BWP in FIGS. 4A-4C, and not support simultaneously receiving non-MBS information and MBS data packets on the initial/dedicated DL BWP and the MBS DL BWP in FIGS. 4E and 4F. In such implementations and scenarios, some UEs like UE 102B may suspend receiving MBS information while communicating non-MBS information with the base station 104, as will be further described below in FIG. 3C.

FIG. 3C illustrates a scenario 300C similar to the scenario 300B of FIG. 3B, but in which the UE 102 suspends receiving MBS information (i.e., MBS data packets and MBS control information) while communicating non-MBS data, non-MBS control signals, or other suitable non-MBS information with the base station 104. For example, UE 102B may not be capable of simultaneously receiving MBS information and non-MBS information. As in FIG. 3B, the base station 104 transmits 302, to the UE 102 via the cell 124, system information, including the initial DL BWP configuration and initial UL BWP configuration. In some implementations, the base station 104 also sends, to the UE 102, RRC message(s) including a configuration of a dedicated DL BWP and/or a configuration of the dedicated UL BWP, as described above in scenario 300B. The base station 104 then transmits 304 the MBS configuration(s) to the UE 102 on the initial DL BWP. The base station 104 then transmits 306 MBS control information on the initial DL BWP or the first MBS DL BWP (or the second MBS DL BWP if the base station 104 does not allocate the first MBS DL BWP), and transmits 308 MBS data packets on the first MBS DL BWP or second MBS DL BWP.

As depicted in scenario 300C, the UE 102 communicates 311 non-MBS data, non-MBS control signals, or other suitable non-MBS information (e.g., random access response, paging, system information, CMAS or ETWS) with the base station 104 on a DL BWP (i.e., initial DL BWP, dedicated DL BWP, first MBS DL BWP, or second MBS DL BWP) and a UL BWP (i.e., initial UL BWP, dedicated UL BWP). If the UE 102 is enabled to receive MBS information while communicating 311 non-MBS information with the base station 104, the UE 102 deactivates (e.g., stops) 309A, 309B receiving the MBS information, so that the UE 102 communicates 311 non-MBS information with the base station 104 while the UE 102 suspends receiving MBS information on the initial DL BWP, the first MBS DL BWP, or the second MBS DL BWP.

In some implementations, the UE 102 may not support simultaneously receiving the non-MBS information and MBS information due to limitations on receiver and/or baseband processing capabilities. For example, with reference to FIGS. 4A-4F, the UE 102 cannot simultaneously receive the non-MBS information and MBS information because the UE 102 cannot simultaneously process non-MBS information and MBS information in its baseband processing.

As another example, with reference to FIG. 4D in which the MBS DL BWP 412D partially overlaps with the initial/dedicated BWP 402D, and FIG. 4E in which the MBS DL BWP 412E does not overlap with the initial/dedicated BWP 402E, if the UE 102 is initially tuned to initial/dedicated DL BWP 402D or 402E, the UE 102 may not simultaneously receive non-MBS information on the initial/dedicated DL BWP 402D or 402E and MBS information on the MBS DL BWP 412D or 412E, because the MBS DL BWP 412D or 412E is not entirely within the initial/dedicated DL BWP 402D or 402E, respectively. If the UE 102 is initially tuned to the MBS DL BWP 412D or 412E, the UE 102 may still not simultaneously receive non-MBS information on the initial/dedicated DL BWP 402D or 402E and MBS information on the MBS DL BWP 412D or 412E, because the MBS DL BWP 412D or 412E is not entirely within the initial/dedicated DL BWP 402D or 402E, respectively. Accordingly, in this example, although the UE 102 can retune its receiver to receive either the non-MBS information or MBS information (i.e., by switching from the MBS DL BWP 412D or 412E to the initial/dedicated DL BWP 402D or 402E to receive non-MBS information, or from the initial/dedicated DL BWP 402D or 402E to the MBS DL BWP 412D or 412E to receive MBS information), the UE 102 cannot simultaneously receive non-MBS information and MBS information.

Although the initial/dedicated BWP 402D and 402E and MBS DL BWP 412D and 412 E in respective FIGS. 4D and 4E are each narrower than the entire DL bandwidth 400 of the cell 124, in some implementations, the initial/dedicated BWP 402D and 402E and MBS DL BWP 412D and 412 E can span the entire DL bandwidth 400 of the cell 124.

In some implementations, the UE 102 may resume receiving MBS information on the initial DL BWP, the first MBS DL BWP or the second MBS DL BWP after the UE 102 stops communicating non-MBS information with the base station 104.

FIG. 5A corresponds to a scenario in which a distributed base station (including a CU and DU) can allocate MBS DL BWP(s), so that the distributed base station can transmit MBS information (e.g., MBS control information, MBS data packets) to a UE. FIG. 5B corresponds to a scenario in which the distributed base station can update the MBS configuration(s) and/or MBS control information previously transmitted to the UE. FIG. 5C corresponds to a scenario in which the distributed base station can deactivate (i.e., stop) transmitting MBS information to the UE. While FIGS. 5A-5C and the accompanying descriptions refer specifically to the UE 102 and base stations 104 of FIG. 1 supporting 5G capabilities, it is understood that the following techniques may be implemented by other components and/or in systems other than the wireless communication system 100 of FIG. 1A to support other technologies, such as 6G radio access and/or 6G core network, for example.

FIG. 5A illustrates a scenario 500A similar to the scenario 300A of FIG. 3A, but in which the base station 104 is a distributed base station that includes a central unit (CU) 172 and a distributed unit (DU) 174.

As in FIG. 3A, the DU 174 transmits 502, to the UE 102 via the cell 124, system information, including the initial DL BWP configuration and initial UL BWP configuration, similar to event 302. In some implementations, the DU 174 also sends, to the UE 102, RRC message(s) including a configuration of a dedicated DL BWP and/or a configuration of the dedicated UL BWP, as described above in scenario 300A.

Later in time, the CU 172 sends 512 one or more interface messages (hereinafter "first interface message(s)") to the DU 174, e.g., when the CU 172 determines to initiate MBS (e.g., IPv4/IPv6 multicast delivery, IPTV, software delivery over wireless, group communications and IoT applications, V2X applications, emergency messages related to public safety). In some implementations, in response to receiving the first interface message(s), the DU 174 can allocate the first MBS DL BWP and/or the second MBS DL BWP, generate MBS configuration(s) corresponding to the first MBS DL BWP and/or the second MBS DL BWP, and transmit 504 the MBS configuration(s) on the initial DL BWP, similar to event 304. In other implementations, the CU 172 can allocate the first MBS DL BWP and/or the second MBS DL BWP, and include MBS configuration(s) corresponding to the first MBS DL BWP and/or the second MBS DL BWP in the first interface message(s). In response to receiving the first interface message(s), the DU 174 transmits 504 the MBS configuration(s) on the initial DL BWP.

In some implementations, the CU 172 generates MBS control information and includes the MBS control information in the first interface message(s). Upon receiving the first interface message(s), the DU 174 can transmit 506 the MBS control information (e.g., in an RRC message or system information) to the UE 102 on the initial DL BWP or the first MBS DL BWP (or the second MBS DL BWP if the DU 174 or CU 172 does not allocate the first MBS DL BWP), similar to event 306. In other implementations, the CU 172 does not include MBS control information in the first interface message(s). The DU 174 can generate the MBS control information (e.g., after receiving the first interface message(s) from the CU 172) and transmit 506 the MBS control information to the UE 102.

In some implementations, the CU 172 can include, in the first interface message(s), the system information of event 504 and/or the RRC message including the MBS control information of event 506. Upon receiving the first interface message(s), the DU 174 broadcasts the system information and/or the RRC message including the MBS control information to the UE 102 at events 504 and 506, respectively.

In yet other implementations, the CU 172 can include a portion of the MBS configuration(s) and/or a portion of the MBS control information in the first interface message(s). Upon receiving the first interface message(s), the DU 174 generates the remainder of the MBS configuration(s), and generates and broadcasts 504 the system information including the portion of the MBS configuration(s) and the remainder of the MBS configuration(s). Similarly, the DU 174 generates the remainder of the MBS control information, and transmits 506 the system information or RRC message including the portion of the MBS control information and the remainder of the MBS control information. In these implementations, the first interface message(s) can include an SFN area identity and/or MBS session information.

In some implementations, the CU 172 can include the MBS configuration(s), or portion thereof, in a first message among the first interface message(s), and the MBS control information, or portion thereof, in a second message among the first interface message(s). Each of the first and second messages can either be an existing F1AP message or a new F1AP message dedicated for MBS. The first and second messages can be instances of the same type of message, of different types of messages. In some implementations, upon receiving the first and/or second messages from the CU 172, the DU 174 can send corresponding first interface response message(s) to the CU 172. These first interface response message(s) can each be a new F1AP response message. In some implementations, the DU 174 can include the configuration(s) and/or information generated by the DU 174 in the first interface response message(s) so that the CU 172 can be aware of the configuration(s) and/or information. The CU 172 may exchange the configuration(s) and/or information with another DU or CU for MBS operation.

After the DU 174 broadcasts the system information and/or the RRC message including the MBS control information to the UE 102 at events 504 and 506, the CU 172 can transmit MBS data packets to the DU 174, which in turn transmits MBS data packets on the first MBS DL BWP or second MBS DL BWP to the UE 102, as shown in event 508, similar to event 308. Events 502, 512, 504, 506, and 508 are collectively referred to as an MBS configuration and transmission procedure 550.

In some implementations, the DU 174 can establish one or more instances of an RLC entity for transmitting the MBS control information and MBS data packets (e.g., associated to a particular MBS stream, MRB or MBS session ID). For example, a first RLC entity can generate RLC PDU(s) to include the MBS control information and transmit the RLC PDU(s), and a second RLC entity can generate RLC PDU(s) to include the MBS data packets and transmit the RLC PDU(s). Each of the RLC PDU(s) can be an unacknowledged mode (UM) PDU, and the RLC entity maintains variables and generates a sequence number for each of the UM PDUs. For example, the DU 174 can establish the first RLC entity for transmitting 506 the MBS control information in response to a third message among the first interface message(s), and the second RLC entity for transmitting 508 MBS data packets in response to a fourth message among the first interface message(s). Each of the third and fourth messages can either be an existing F1AP message or a new F1AP message. The third and fourth messages can be instances of the same type of message, of different types of messages. The third and fourth messages may be the same or different types of messages than the first and second messages of the first interface response message(s) described above. In some implementations, upon receiving the third and/or fourth messages from the CU 172, the DU 174 can send corresponding first interface response message(s) to the CU 172. These first interface response message(s) can each be a new F1AP response message.

The existing F1AP message described above can be a non-UE associated message such as gNB-CU Configuration Update message or F1 Setup Response message. The new F1AP message can be a non-UE associated message such as an MBS Configuration Update message, MBS Setup Request message, or MBS Context Setup Request message. The new F1AP response message described above can be a non-UE associated message such as an MBS Setup Response message, or MBS Context Setup Response message.

In some implementations, the CU 172 can send a UE-associated message for a particular UE 102 (e.g., UE 102A or UE 102B) to the DU 174 to request the DU 174 to allocate radio resources for transmitting unicast data to the particular UE 102 and receiving unicast data from the UE 102, after transmitting the first interface message(s). The DU 174 can generate a UE-associated response message including radio resource configuration (e.g., a CellGroupConfig 1E) for the UE 102 and send the UE-associated response message to the CU 172, in response to the UE-associated message. For example, the UE-associated message and the UE-associated response message can be a UE Context Setup Request and a UE Context Setup Response message, respectively. In another example, the UE-associated message and the UE-associated response message can be a UE Context Modification Request and a UE Context Modification Response message, respectively.

FIG. 5B corresponds to a scenario 500B in which the base station 104 updates the MBS configuration(s) and/or MBS control information (e.g., in events 504, 506) transmitted to the UE 102. As in FIG. 5A, the base station 104 performs the MBS configuration and transmission procedure 550.

Later in time, the CU 172 determines to update the MBS configuration(s) and/or MBS control information previously transmitted to the UE 102 with modified (or new) MBS configuration(s) and/or MBS control information. In response, the CU 172 sends 516 one or more interface messages (hereinafter "second interface message(s)") to the DU 174. In some implementations, in response to receiving the second interface message(s), the DU 174 can modify the previous allocation of the first MBS DL BWP and/or the second MBS DL BWP, modify the previous MBS configuration(s) corresponding to the modified first MBS DL BWP and/or the second MBS DL BWP, and transmit 517 the modified MBS configuration(s) on the initial DL BWP. In other implementations, the CU 172 can modify the previous allocation of the first MBS DL BWP and/or the second MBS DL BWP, and include modified MBS configuration(s) corresponding to the first MBS DL BWP and/or the second MBS DL BWP in the second interface message(s). In response to receiving the second interface message(s), the DU 174 transmits 517 the modified MBS configuration(s) on the initial DL BWP.

In some implementations, the CU 172 modifies the MBS control information and includes the modified MBS control information in the second interface message(s). Upon receiving the second interface message(s), the DU 174 can transmit 518 the modified MBS control information (e.g., in an RRC message or system information) to the UE 102 on the initial DL BWP or the modified first MBS DL BWP (or the second modified MBS DL BWP if the DU 174 or CU 172 does not allocate the modified first MBS DL BWP). In other implementations, the CU 172 does not include modified MBS control information in the second interface message(s). The DU 174 can generate the modified MBS control information (e.g., after receiving the second interface message(s) from the CU 172) and transmit 518 the modified MBS control information to the UE 102.

In some implementations, the CU 172 can include, in the second interface message(s), the system information of event 517 and/or the RRC message including the modified MBS control information of event 518. Upon receiving the second interface message(s), the DU 174 broadcasts the system information and/or the RRC message including the modified MBS control information to the UE 102 at events 517 and 518, respectively.

In yet other implementations, the CU 172 can include a portion of the modified MBS configuration(s) and/or a portion of the modified MBS control information in the second interface message(s). Upon receiving the second interface message(s), the DU 174 generates the remainder of the modified MBS configuration(s), and generates and broadcasts 517 the system information including the portion of the modified MBS configuration(s) and the remainder of the modified MBS configuration(s). Similarly, the DU 174 generates the remainder of the modified MBS control information, and transmits 518 the system information or RRC message including the portion of the modified MBS control information and the remainder of the modified MBS control information. In these implementations, the second interface message(s) can include an SFN area identity and/or MBS session information.

In some implementations, the CU 172 can include the modified MBS configuration(s), or portion thereof, in a first message among the second interface message(s), and the modified MBS control information, or portion thereof, in a second message among the second interface message(s). Each of the first and second messages can either be an existing F1AP message or a new F1AP message dedicated for MBS. The first and second messages can be instances of the same type of message, of different types of messages. In some implementations, upon receiving the first and/or second messages from the CU 172, the DU 174 can send corresponding second interface response message(s) to the CU 172. These second interface response message(s) can each be a new F1AP response message. In some implementations, the DU 174 may include the modified configuration(s) and/or information to the CU 172 so that the CU 172 can be aware of the modified configuration(s) and/or information. The CU 172 may exchange the modified configuration(s) and/or information with another DU or CU for MBS operation.

After the DU 174 broadcasts the system information and/or the RRC message including the modified MBS control information to the UE 102 at events 517 and 518, the CU 172 can transmit MBS data packets to the DU 174, which in turn transmits MBS data packets on the modified first MBS DL BWP or modified second MBS DL BWP to the UE 102, as shown in event 520. In some implementations, the DU 174 can establish one or more instances of an RLC entity for transmitting the modified MBS control information and MBS data packets (e.g., associated to a particular MBS stream, MRB or MBS session ID), as described above in scenario 500A.

In some implementations, the DU 174 can use the established one or more instances of the RLC entity for transmitting the modified MBS control information and MBS data packets (e.g., associated to a particular MBS stream, MRB, or MBS session ID). In other implementations, the DU 174 can establish one or more new instances of an RLC entity for transmitting the modified MBS control information and MBS data packets (e.g., associated to a particular MBS stream, MRB or MBS session ID) instead of using the established one or more instances of the RLC entity.

FIG. 5C corresponds to a scenario 500C in which the base station 104 can stop transmitting MBS information (i.e., MBS control information and MBS data packets) to the UE 102. As in FIG. 5A, the base station 104 performs the MBS configuration and transmission procedure 550.

Later in time, the CU 172 determines to stop transmitting the MBS configuration(s) and/or MBS control information to the UE 102, e.g., when programming from a broadcasting station ends. In response, the CU 172 sends 522 one or more interface messages (hereinafter "third interface message(s)") to the DU 174. In some implementations, in response to receiving the third interface message(s), the DU 174 can deactivate (i.e., stop) 524 transmitting any additional MBS configuration(s) on the initial DL BWP and/or MBS data packets on the first MBS DL BWP or second MBS DL BWP to the UE 102.

Each of the third interface message(s) can be a new F1AP message dedicated for MBS, as described above in scenario 500A. In some implementations, upon receiving the third interface message(s) from the CU 172, the DU 174 can send corresponding third interface response message(s) to the CU 172. These third interface response message(s) can each be a new F1AP response message, as described above in scenario 500A.

FIGS. 6A-6C correspond to flow diagrams in which a base station transmits MBS information (e.g., MBS control information and/or MBS data packets) to a UE. FIGS. 7A-7B correspond to flow diagrams in which a base station transmits non-MBS information and MBS information to a UE. FIGS. 8-12 correspond to flow diagrams in which a CU and DU of a distributed base station coordinate management of MBS DL BWPs so that the distributed base station can transmit MBS information or non-MBS information to a UE. FIGS. 13A-13C correspond to flow diagrams in which a UE receives MBS information from a base station. FIGS. 14A-14E correspond to flow diagrams in which a UE receives MBS information and/or non-MBS information from a base station. While FIGS. 6A-6C, 7A-7B, 8-12, 13A-13C, and 14A-14E and the accompanying descriptions refer specifically to the UE 102 and base stations 104 of FIG. 1 supporting 5G capabilities, it is understood that the following techniques may be implemented by other components and/or in systems other than the wireless communication system 100 of FIG. 1A to support other technologies, such as 6G radio access and/or 6G core network, for example.

Referring first to FIG. 6A, an example method 600A can be implemented in a base station (e.g., base station 104) for transmitting MBS data packet(s) to a UE (e.g., UE 102) via a cell (e.g., cell 124) covered by the base station.

At block 602A, the base station transmits, to the UE, system information configuring an initial DL BWP of the cell (e.g., in events 302, 502), where the base station can transmit non-MBS data and/or DL control signals to the UE.

At block 604A, the base station transmits, to the UE, an MBS configuration configuring at least one MBS DL BWP on the initial DL BWP (e.g., in events 304, 504). In some implementations, the MBS configuration may configure a single MBS DL BWP (e.g., the first MBS DL BWP described in FIG. 3A) or more than one MBS DL BWP (e.g., the first MBS DL BWP and second MBS DL BWP described in FIG. 3A). The MBS DL BWP can overlap (or alternatively not overlap) with the initial DL BWP.

At block 606A, the base station transmits, to the UE, MBS data packet(s) on the MBS DL BWP (e.g., in events 308, 508).

FIG. 6B depicts an example method 600B, implemented in a base station (e.g., base station 104), for transmitting MBS control information and MBS data packet(s) to a UE (e.g., UE 102) via a cell (e.g., cell 124) covered by the base station.

At block 602B, the base station transmits, to the UE, system information configuring an initial DL BWP of the cell (e.g., in events 302, 502), where the base station can transmit non-MBS data and/or DL control signals to the UE, similar to block 602A.

At block 604B, the base station transmits, to the UE, an MBS configuration configuring a single MBS DL BWP on the initial DL BWP (e.g., in events 304, 504). The MBS configuration can be the first MBS configuration described in FIG. 3A, and the single MBS DL BWP can be the first MBS DL BWP described in FIG. 3A.

At block 606B, the base station transmits, to the UE, MBS control information on the first MBS DL BWP (e.g., in events 306, 506). The MBS control information can include another MBS configuration (e.g., the second MBS configuration described in FIG. 3A) configuring another MBS DL BWP (e.g., the second MBS DL BWP described in FIG. 3A).

At block 608B, the base station transmits, to the UE, MBS data packet(s) on the second MBS DL BWP (e.g., in events 308, 508). Accordingly, the base station transmits MBS control information and MBS data packet(s) on different MBS DL BWPs. The second MBS DL BWP can overlap (or alternatively not overlap) with the first MBS DL BWP.

FIG. 6C depicts an example method 600C, implemented in a base station (e.g., base station 104), for transmitting MBS control information and MBS data packet(s) to a UE (e.g., UE 102) via a cell (e.g., cell 124) covered by the base station. Whereas the base station of FIG. 6B transmits MBS control information and MBS data packet(s) to the UE on different MBS DL BWPs, the base station of FIG. 6C can transmit MBS control information and MBS data packet(s) to the UE on the same MBS DL BWP.

At block 602C, the base station transmits, to the UE, system information configuring a single MBS DL BWP on the cell (e.g., in events 304, 504), similar to block 604B. The single MBS DL BWP can be the first MBS DL BWP described in FIG. 3A.

At block 604C, the base station transmits, to the UE, MBS control information on the first MBS DL BWP (e.g., in events 306, 506). Whereas the base station of FIG. 6B transmits MBS control information (i.e., and not the MBS data packet(s)) on the first MBS DL BWP, the base station of FIG. 6C also transmits MBS data packet(s) on the first MBS DL BWP (e.g., in events 308, 508). Accordingly, the base station transmits MBS control information and MBS data packet(s) on the same MBS DL BWP.

Referring now to FIG. 7A, an example method 700A can be implemented in a base station (e.g., base station 104) for transmitting non-MBS information and MBS information to a UE (e.g., UE 102) via a cell (e.g., cell 124) covered by the base station.

At block 702A, the base station transmits, to the UE, non-MBS information (i.e., non-MBS data and/or DL control signals) on an initial DL BWP of the cell (e.g., in events 310, 311). The base station may have previously transmitted system information to configure the initial DL BWP so that the base station can transmit the non-MBS information (e.g., in blocks 602A, 602B).

At block 704A, the base station transmits, to the UE, MBS information on a single MBS DL BWP on the initial DL BWP (e.g., in block 604C). In some implementations, the UE can receive the non-MBS information and MBS information from the base station simultaneously (e.g., in event 310). In other implementations, the UE suspends receiving the MBS information while receiving the non-MBS information (e.g., in event 311), and thus can only receive the MBS information from the base station separately after receiving the MBS information.

FIG. 7B depicts an example method 700B, implemented in a base station (e.g., base station 104), for transmitting MBS control information and MBS data packet(s) to a UE (e.g., UE 102) via a cell (e.g., cell 124) covered by the base station. Whereas the base station of FIG. 7A transmits MBS information to the UE on the same MBS DL BWP, the base station of FIG. 7B can transmit MBS information to the UE on different MBS DL BWPs.

At block 702B, the base station transmits, to the UE, non-MBS information on an initial DL BWP of the cell, similar to block 702A.

At block 704B, the base station transmits, to the UE, a first portion of MBS information (e.g., MBS control information) on an MBS DL BWP on the initial DL BWP (e.g., the first MBS DL BWP described in FIG. 3A), similar to block 606B.

At block 706B, the base station transmits, to the UE, a second portion of the MBS information (e.g., MBS data packet(s)) on another MBS DL BWP on the initial DL BWP (e.g., the second MBS DL BWP described in FIG. 3A), similar to block 608B. Accordingly, the base station transmits the MBS information on different MBS DL BWPs. In some implementations, the UE can receive the non-MBS information and MBS information from the base station simultaneously (e.g., in event 310). In other implementations, the UE suspends receiving the MBS information while receiving the non-MBS information (e.g., in event 311), and thus can only receive the MBS information from the base station separately after receiving the MBS information.

Referring now to FIG. 8, an example method 800 can be implemented in a DU of a distributed base station (e.g., DU 174) for transmitting MBS data packet(s) from a CU (e.g., CU 172) to a UE (e.g., UE 102) via a cell (e.g., cell 124) covered by the distributed base station.

At block 802, the DU receives an interface message (e.g., MBS Setup Request message) from the CU to request the DU to allocate radio resources for transmitting MBS data packets for a plurality of UEs, including UE 102 (e.g., in event 512).

At block 804, in response to receiving the interface message in some implementations, the DU can send a response interface message (e.g., MBS Setup Response message) to the CU to confirm the allocation of radio resources.

At block 806, the DU receives MBS data packets from the CU (e.g., in event 512), and at block 808, transmits the MBS data packets to the UE on the radio resources allocated by the DU via the cell (e.g., in event 512).

FIG. 9 depicts an example method 900, implemented in a DU of a distributed base station (e.g., DU 174) for configuring a UE (e.g., UE 102) to receive MBS data packet(s) from a CU (e.g., CU 172) via the DU.

At block 902, the DU transmits system information configuring an initial DL BWP to a plurality of UEs (e.g., in event 502). In some implementations, the system information can include an initial DL BWP configuration corresponding to the initial DL BWP.

At block 904, the DU receives MBS configuration(s) from the CU (e.g., in event 512). In some implementations, the MBS configuration(s) may configure a single MBS DL BWP (e.g., the first MBS DL BWP described in FIG. 3A) or more than one MBS DL BWP (e.g., the first MBS DL BWP and second MBS DL BWP described in FIG. 3A).

At block 906, the DU transmits the received MBS configuration(s) to the plurality of UEs on the initial DL BWP (e.g., in event 504), or in other implementations, on an MBS DL BWP (e.g., the first MBS DL BWP).

At block 908, the DU receives MBS data packet(s) from the CU (e.g., in event 508), and at block 910, transmits the MBS data packet(s) to the plurality of UEs (e.g., in event 508). In some implementations, the DU transmits the MBS data packet(s) to the plurality of UEs on another MBS DL BWP (e.g., the second MBS DL BWP) different than the MBS DL BWP described at block 906. In other implementations, e.g., if the MBS configuration(s) only configures a single MBS DL BWP (e.g., the first MBS DL BWP), the DU transmits the MBS data packet(s) to the plurality of UEs on the same MBS DL BWP (e.g., the first MBS DL BWP) described at block 906.

FIG. 10 depicts an example method 1000, implemented in a CU of a distributed base station (e.g., CU 172) for sending MBS configuration(s) to a DU (e.g., DU 174) in addition to those transmitted to the DU in FIG. 9. The additional MBS configuration(s) may be new MBS configuration(s) or serve as an update to the previously transmitted MBS configuration(s).

At block 1002, the CU transmits MBS configuration(s) to the DU, so that the DU can transmit the MBS configuration(s) to a plurality of UEs, including UE 102 (e.g., in event 512). In some implementations, the CU can transmit, via interface message(s) (e.g., the first interface message(s) described in event 512), system information, which includes the MBS configuration(s). The MBS configuration(s) can be the first MBS configuration described in FIG. 3A.

At block 1004, the CU transmits additional MBS configuration(s) to the DU, so that the DU can transmit the additional MBS configuration(s) to the plurality of UEs (e.g., in event 516). In some implementations, the CU can transmit, via interface message(s) (e.g., the second interface message(s) described in event 516), an MBS control information message, which includes the additional MBS configuration(s). The additional MBS configuration(s) can be the second MBS configuration described in FIG. 3A. The additional MBS configuration(s) may be new MBS configuration(s) or serve as an update to the previously transmitted first MBS configuration. In either case, the DU, upon receiving the additional MBS configuration(s), may modify previously allocated radio resources (e.g., at block 802 of FIG. 8) to transmit MBS data packet(s), as will be described below in FIG. 11.

FIG. 11 depicts an example method 1100, implemented in a DU of a distributed base station (e.g., DU 174) for modifying previously allocated MBS radio resources and sending MBS data packet(s) received from a CU (e.g., CU 172) to a UE (e.g., UE 102) on the modified MBS radio resources.

At block 1102, the DU receives an interface message (e.g., an MBS Modification Request message) from the CU to request the DU to modify radio resources previously allocated for transmitting MBS data packet(s) to a plurality of UEs (e.g., in event 516).

At block 1104, in response to receiving the interface message in some implementations, the DU can send a response interface message (e.g., MBS Modification Response message) to the CU to confirm the modification of the radio resources.

At block 1106, the DU receives MBS data packets from the CU (e.g., in event 520), and at block 1108, transmits the MBS data packets to the plurality of UEs on the modified radio resources (e.g., in event 520).

FIG. 12 depicts an example method 1200, implemented in a DU of a distributed base station (e.g., DU 174) for releasing previously allocated MBS radio resources.

At block 1202, the DU receives an interface message (e.g., an MBS Release Request message) from a CU (e.g., CU 172) to request the DU to release radio resources previously allocated, e.g., the radio resources at blocks 804 or 1104.

At block 1204, in response to receiving the interface message, the DU releases the radio resources.

At block 1206, in response to receiving the interface message in some implementations, the DU can send a response interface message (e.g., MBS Release Response message) to the CU to confirm the release of the radio resources. As such, the DU is deactivated from receiving MBS data packets from the CU and transmitting the MBS data packets to a plurality of UEs, including UE 102.

Referring now to FIG. 13A, an example method 1300A can be implemented in a UE (e.g., UE 102) for receiving MBS information from a base station (e.g., base station 104) via a cell (e.g., cell 124) covered by the base station.

At block 1302A, the UE receives, from the base station, system information configuring an initial DL BWP of the cell (e.g., in events 302, 502), where the UE can receive non-MBS data and/or DL control signals from the base station.

At block 1304A, the UE receives, from the base station, an MBS configuration configuring at least one MBS DL BWP on the initial DL BWP (e.g., in events 304, 504). In some implementations, the MBS configuration may configure a single MBS DL BWP (e.g., the first MBS DL BWP described in FIG. 3A) or more than one MBS DL BWP (e.g., the first MBS DL BWP and second MBS DL BWP described in FIG. 3A). The MBS DL BWP can overlap (or alternatively not overlap) with the initial DL BWP.

If the MBS configuration configures more than one MBS DL BWP, at block 1306A, the UE selects one of the MBS DL BWPs.

At block 1308A, the UE receives, from the base station, MBS information on the single MBS DL BWP, or the MBS DL BWP selected at block 1306A if the MBS configuration configured more than one MBS DL BWP (e.g., in events 308, 508).

FIG. 13B depicts an example method 1300B, implemented in a UE (e.g., UE 102), for receiving MBS control information and MBS data packet(s) from a base station (e.g., base station 104) via a cell (e.g., cell 124) covered by the base station. Whereas the UE of FIG. 13A receives MBS information from the base station on the same MBS DL BWP, the UE of FIG. 13B can receive MBS information from the base station on different MBS DL BWPs.

At block 1302B, the UE receives, from the base station, MBS control information on an MBS DL BWP, such as the first MBS DL BWP described in FIG. 3A (e.g., in events 306, 506). The MBS control information can include an MBS configuration for configuring another MBS DL BWP, such as the second MBS DL BWP described in FIG. 3A.

At block 1304B, the UE receives, from the base station, MBS data packet(s) on the second MBS DL BWP (e.g., in events 308, 508). Accordingly, the UE receives, from the base station, MBS control information and MBS data packet(s) on different MBS DL BWPs. The second MBS DL BWP can overlap (or alternatively not overlap) with the first MBS DL BWP.

FIG. 13C depicts an example method 1300C, implemented in a UE (e.g., UE 102), for receiving MBS information from a base station (e.g., base station 104) via a cell (e.g., cell 124) covered by the base station. Whereas the UE of FIGS. 13A and 13B receives MBS information from the base station on MBS DL BWP(s), the UE of FIG. 13C can receive MBS information from the base station on an initial DL BWP if MBS DL BWP(s) are not configured for the cell.

At block 1302C, the UE initiates (e.g., activates) receiving MBS information.

At block 1304C, the UE determines whether MBS DL BWP(s) are configured for the cell. If the UE determines that MBS DL BWP(s) are configured for the cell, the UE at block 1306C receives MBS information on the MBS DL BWP(s), similar to blocks 1308A, 1302B, 1304B.

However, if the UE determines that MBS DL BWP(s) are not configured for the cell at block 1304C, the UE at block 1308C receives the MBS information on an initial DL BWP configured by the base station (e.g., in event 306). In some implementations, the UE recognizes the initial DL BWP according to the system information received from the base station (e.g., at block 1302A).

Referring now to FIG. 14A, an example method 1400A can be implemented in a UE (e.g., UE 102) for receiving MBS information while simultaneously communicating non-MBS information (i.e., non-MBS data and/or non-MBS control signals) with the base station (e.g., base station 104) via a cell (e.g., cell 124) covered by the base station.

At block 1402A, the UE receives, from the base station, non-MBS information on a non-MBS DL BWP of the cell. In some implementations, the non-MBS DL BWP can be an initial DL BWP configured by the base station 104, e.g., when the UE receives, from the base station via the cell, system information including the initial DL BWP configuration corresponding to the initial DL BWP described above in FIG. 3A. In other implementations, the non-MBS DL BWP can be a dedicated DL BWP, e.g., when the UE receives, from the base station via the cell, RRC message(s) including a configuration of the dedicated DL BWP described above in FIG. 3A.

At block 1404A, while receiving non-MBS information, the UE initiates (e.g., activates) receiving MBS information. Thus, if MBS information is available for transmission to the UE, at block 1406A, the UE receives MBS information on an MBS DL BWP of the cell, while continuing to receive non-MBS information on the non-MBS DL BWP (e.g., in event 310). In some implementations, the MBS DL BWP can be the initial DL BWP. In other implementations, the MBS DL BWP can be the first MBS DL BWP (or the second MBS DL BWP if the base station does not allocate the first MBS DL BWP) described above in FIG. 3A.

FIG. 14B depicts an example method 1400B, implemented in a UE (e.g., UE 102), in which the UE suspends receiving MBS information while communicating non-MBS information with the base station (e.g., base station 104) via a cell (e.g., cell 124) covered by the base station.

At block 1402B, the UE receives, from the base station, non-MBS information on a non-MBS DL BWP (e.g., initial DL BWP, dedicated DL BWP) of the cell, similar to block 1402A.

At block 1404B, the UE suspends receiving MBS information while receiving the non-MBS information (e.g., in event 311), and thus can only receive the MBS information from the base station separately after receiving the MBS information.

FIG. 14C depicts an example method 1400C, implemented in a UE (e.g., UE 102), in which the UE suspends receiving non-MBS information while communicating MBS information with the base station (e.g., base station 104) via a cell (e.g., cell 124) covered by the base station.

At block 1402C, the UE receives, from the base station, non-MBS information on a non-MBS DL BWP (e.g., initial DL BWP, dedicated DL BWP) of the cell, similar to block 1402A.

At block 1404C, while receiving non-MBS information, the UE initiates receiving MBS information, similar to block 1404A. Thus, if MBS information is available for transmission to the UE, the UE can receive MBS information on an MBS DL BWP of the cell. However, prior to receiving the MBS information, the UE at block 1406C suspends receiving the non-MBS information in response to the initiation at block 1404C.

At block 1408C, the UE then receives the MBS information on an MBS DL BWP (e.g., initial DL BWP, first MBS DL BWP, second MBS DL BWP) of the cell after the suspension at block 1406C. In some implementations, after receiving the MBS information, the UE can activate receiving the non-MBS information, and receive any remaining non-MBS information.

FIG. 14D depicts an example method 1400D, implemented in a UE (e.g., UE 102), in which the UE suspends receiving MBS information while receiving non-MBS information from the base station (e.g., base station 104) via a cell (e.g., cell 124) covered by the base station, if the UE is configured to receive the MBS information in an MBS DL BWP that is entirely within a non-MBS DL BWP in which the UE is configured to receive the non-MBS information.

At block 1402D, the UE receives, from the base station, non-MBS information on a non-MBS DL BWP (e.g., initial DL BWP, dedicated DL BWP) of the cell, similar to block 1402B.

At block 1404D, the UE determines whether the UE is configured to receive MBS information on an MBS DL BWP (e.g., initial DL BWP, first MBS DL BWP, second MBS DL BWP) that is entirely within the non-MBS DL BWP.

If the UE at block 1404D determines that MBS DL BWP (e.g., MBS DL BWP 412B, 412C) is entirely within the non-MBS DL BWP (e.g., non-MBS DL BWP 402B, 402C), then the UE at block 1406D receives MBS information on the MBS DL BWP while continuing to receive the non-MBS information.

If the UE at block 1404D determines that MBS DL BWP (e.g., MBS DL BWP 412A, 412D, 412F) is not entirely within the non-MBS DL BWP (e.g., non-MBS DL BWP 402A, 402D, 402F), then the UE at block 1408A suspends receiving MBS information. In this way, the UE prioritizes receiving unicast information over multicast or broadcast information from the base station, and saves power because the UE need not retune its receiver to receive both the MBS information and the non-MBS information.

FIG. 14E depicts an example method 1400E, implemented in a UE (e.g., UE 102), in which the UE receives MBS information while receiving non-MBS information from the base station (e.g., base station 104) via a cell (e.g., cell 124) covered by the base station, by retuning its receiver if necessary.

At block 1402E, the UE receives, from the base station, non-MBS information on a non-MBS DL BWP (e.g., initial DL BWP, dedicated DL BWP) of the cell, similar to block 1402D.

At block 1404E, the UE determines whether the UE is configured to receive MBS information on an MBS DL BWP (e.g., initial DL BWP, first MBS DL BWP, second MBS DL BWP) that is entirely within the non-MBS DL BWP, similar to block 1404D.

If the UE at block 1404E determines that MBS DL BWP (e.g., MBS DL BWP 412B, 412C) is entirely within the non-MBS DL BWP (e.g., non-MBS DL BWP 402B, 402C), then the UE at block 1406E receives MBS information on the MBS DL BWP while continuing to receive the non-MBS information.

If the UE at block 1404E determines that MBS DL BWP (e.g., MBS DL BWP 412A, 412D, 412F) is not entirely within the non-MBS DL BWP (e.g., non-MBS DL BWP 402A, 402D, 402F), then the UE at block 1405E retunes its receiver to the MBS DL BWP, and thus at block 1406E can receive MBS information on the MBS DL BWP. In this way, the UE prioritizes receiving multicast or broadcast information over unicast information over from the base station.

FIG. 15 is a flow diagram of an example method 1500 implemented in a base station (e.g., base station 104) for configuring BWPs in a certain cell (e.g., cell 124), for access by UEs (e.g., including UE 102).

At block 1502, a base station configures an initial BWP within a bandwidth of a cell (e.g., in events or blocks 302, 502, 550).

At block 1504, the base station configures an MBS BWP within the bandwidth of the cell (e.g., in events or blocks 304, 504, 306, 512, 550, 516, 517, 518, 804, 1002, 1004, 1104). The MBS BWP is dedicated to conveying MBS information.

At block 1506, the base station transmits, in the cell, an indication of the initial BWP and the MBS BWP, to provide a UE with access to the initial BWP and the MBS BWP (e.g., in events or blocks 302, 304, 306, 502, 504, 506, 550, 517, 518, 602A, 604A, 602B, 604B, 606B, 602C, 604C, 704A, 704B, 706B, 902, 906).

FIG. 16 is a flow diagram of an example method 1600 in which a UE (e.g., UE 102) of FIG. 1A accesses a RAN (e.g., RAN 105) via BWPs in a certain cell (e.g., cell 124).

At block 1602, a UE receives, from a RAN, an indication of an initial BWP and an indication of an MBS BWP (e.g., in events or blocks 302, 304, 306, 502, 504, 506, 550, 517, 518, 1302A, 1304A, 1308A, 1302B, 1306C, 1308C, 1406A, 1408C, 1406D, 1406E).

At block 1604, the UE accesses the RAN via the initial BWP and the MBS BWP to communicate non-MBS information and MBS information, respectively (e.g., in events or blocks 306, 308, 310, 311, 506, 508, 550, 518, 520, 1308A, 1302B, 1304B, 1306C, 1308C, 1406A, 1408C, 1406D, 1406E).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for switching between UL BWPs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Example 1. A method in a base station, the method comprising: configuring, by processing hardware, an initial bandwidth part (BWP) within a bandwidth of the cell; configuring, by the processing hardware, a multicast and broadcast services (MBS) BWP within the bandwidth of the cell Lithe MBS BWP dedicated to conveying MBS information; and transmitting, by the processing hardware and in the cell, an indication of the initial BWP and an indication of the MBS BWP, to provide a user equipment (UE) with access to the initial BWP and the MBS BWP.

Example 2. The method of example 1, wherein the transmitting includes: transmitting a system information block (SIB) indicating the initial BWP and the MBS BWP.

Example 3. The method of example 1, wherein the transmitting includes: transmitting a message associated with a protocol for controlling radio resources, the message addressed at the UE and indicating the initial BWP; and transmitting an SIB indicating the MBS BWP.

Example 4. The method of example 1, wherein the transmitting includes: transmitting the indication of the initial BWP in a first SIB, and transmitting the indication of the MBS BWP in a second SIB.

Example 5. The method of any one of examples 1-4, further comprising: transmitting MBS information on a downlink (DL) component of the MBS BWP.

Example 6. The method of example 5, wherein: the MBS BWP includes a first MBS BWP and a second MBS BWP, and transmitting the MBS information includes: transmitting MBS control information on a DL component of the first MBS BWP, and transmitting MBS data on a DL component of the second MBS BWP.

Example 7. The method of example 6, wherein the first MBS BWP is entirely within the second MBS BWP.

Example 8. The method of example 6, wherein the first MBS BWP partially overlaps the second MBS BWP.

Example 9. The method of example 6, wherein the first MBS BWP and the second MBS BWP do not overlap.

Example 10. The method of example 6, wherein the second MBS BWP is smaller than the first MBS BWP and is entirely within the first MBS BWP.

Example 11. The method of any one of examples 5-10, further comprising: transmitting non-MBS information on a DL component of the initial BWP.

Example 12. The method of any one of examples 1-4, further comprising: transmitting MBS information on a DL component of the initial BWP.

Example 13. The method of example 12, wherein transmitting the MBS information includes: transmitting MBS control information on the DL component of the initial BWP; and transmitting MBS data on a DL component of the MBS BWP.

Example 14. The method of examples 12 or 13, further comprising: transmitting non-MBS information on a DL component of the MBS BWP.

Example 15. The method of any of examples 1-14, wherein the MBS BWP is smaller than the initial BWP and is entirely within the initial BWP.

Example 16. The method of any of examples 1-14, wherein the MBS BWP partially overlaps the initial BWP.

Example 17. The method of any of examples 1-14, wherein the initial BWP and the MBS BWP do not overlap.

Example 18. The method of any of examples 1-14, wherein the initial BWP is smaller than then MBS BWP and is entirely within the MBS BWP.

Example 19. The method of any of the preceding examples, wherein configuring each of the initial BWP and the MBS BWP includes configuring a respective uplink (UL) BWP and a respective downlink (DL) BWP.

Example 20. The method of any of the preceding examples, wherein the base station is a distributed base station comprising a distributed unit (DU) and a central unit (CU).

Example 21. The method of example 20, further comprising: transmitting, from the CU to the DU, an interface message indicating that the DU is to configure the MBS BWP.

Example 22. The method of example 21, wherein the interface message includes at least a partial configuration for the MBS BWP.

Example 23. The method of examples 21 or 22, wherein the interface message includes at least a portion of MBS control information.

Example 24. The method of any one of examples 20-23, further comprising: receiving, at the DU and from the CU, a second interface message; in response to receiving the second interface message, updating, by the DU, a configuration of the MBS BWP; and transmitting, by the DU, the updated configuration of the MBS BWP.

Example 25. The method of any one of examples 20-24, further comprising: receiving, by the DU and from the CU, a third interface message; and in response to receiving the third interface message, suspending the transmitting of the MBS information.

Example 26. A base station comprising processing hardware and configured to implement a method of any of examples 1-25.

Example 27. A method in a UE for accessing a radio access network (RAN), the method comprising: receiving, by processing hardware and from the RAN, an indication of an initial BWP and an indication of an MBS BWP; and accessing, by the processing hardware, the RAN via the initial BWP and the MBS BWP to communicate non-MBS information and MBS information, respectively.

Example 28. The method of example 27, wherein the receiving includes: receiving an SIB indicating the initial BWP and the MBS BWP.

Example 29. The method of example 27, wherein the receiving includes: receiving a message associated with a protocol for controlling radio resources, the message addressed at the UE and indicating the initial BWP; and receiving an SIB indicating the MBS BWP.

Example 30. The method of example 27, wherein the receiving includes: receiving the indication of the initial BWP in a first SIB, and receiving the indication of the MBS BWP in a second SIB.

Example 31. The method of any one of examples 27-30, further comprising: receiving MBS information on a downlink (DL) component of the MBS BWP.

Example 32. The method of example 31, wherein: the MBS BWP includes a first MBS BWP and a second MBS BWP, and receiving the MBS information includes: receiving MBS control information on a DL component of the first MBS BWP, and receiving MBS data on a DL component of the second MBS BWP.

Example 33. The method of example 32, wherein the first MBS BWP is entirely within the second MBS BWP.

Example 34. The method of example 32, wherein the first MBS BWP partially overlaps the second MBS BWP.

Example 35. The method of example 32, wherein the first MBS BWP and the second MBS BWP do not overlap.

Example 36. The method of example 32, wherein the second MBS BWP is smaller than the first MBS BWP and is entirely within the first MBS BWP.

Example 37. The method any one of examples 31-36, further comprising: receiving non-MBS information on a DL component of the initial BWP.

Example 38. The method of example 37, wherein receiving the non-MBS information includes: receiving the non-MBS information while receiving the MBS information.

Example 39. The method of example 37, wherein receiving the non-MBS information includes: receiving the non-MBS information while or after the UE suspends receiving the MBS information.

Example 40. The method of example 37, wherein receiving the MBS information includes: receiving the MBS information while or after the UE suspends receiving the non-MBS information.

Example 41. The method of any one of examples 27-30, further comprising: receiving MBS information on a DL component of the initial BWP.

Example 42. The method of example 41, wherein receiving the MBS information includes: receiving MBS control information on the DL component of the initial BWP; and receiving MBS data on a DL component of the MBS BWP.

Example 43. The method of examples 41 or 42, further comprising: receiving non-MBS information on a DL component of the MBS BWP.

Example 44. The method of any of examples 27-43, wherein the MBS BWP is smaller than the initial BWP and is entirely within the initial BWP.

Example 45. The method of any of examples 27-43, wherein the MBS BWP partially overlaps the initial BWP.

Example 46. The method of any of examples 27-43, wherein the initial BWP and the MBS BWP do not overlap.

Example 47. The method of any of examples 27-43, wherein the initial BWP is smaller than then MBS BWP and is entirely within the MBS BWP.

Example 48. The method of any of the preceding examples, wherein the UE is in an idle, inactive, or connected state of a protocol for controlling radio resources between the UE and the RAN when receiving the indication of the initial BWP and the indication of the MBS BWP.

Example 49. A UE comprising processing hardware and configured to implement a method of any of examples 27-48.

What is claimed is:

1. A method in a base station, the method comprising:
configuring, by the base station, an initial bandwidth part (BWP) within a bandwidth of a cell for communicating unicast information between the base station (104) and a user equipment (UE) via the initial BWP;
configuring, by the base station, a multicast and broadcast services (MBS) BWP to have a width that is larger than or same as a width of the initial BWP, the MBS BWP dedicated to conveying MBS information between the base station and the UE, and the MBS BWP including a first MBS BWP and a second MBS BWP; and
transmitting, by the base station and in the cell, an indication of the initial BWP and an indication of the MBS BWP, to provide the UE with access to the initial BWP and the MBS BWP, including transmitting MBS control information on a downlink (DL) component of the first MBS BWP and transmitting MBS data on a DL component of the second MBS BWP.

2. The method of claim 1, further comprising transmitting the unicast information on a DL component of the initial BWP.

3. The method of claim 1, wherein configuring each of the initial BWP and the MBS BWP includes configuring a respective uplink (UL) BWP and a respective downlink (DL) BWP.

4. The method of claim 1, wherein the base station is a distributed base station comprising a distributed unit (DU) and a central unit (CU).

5. The method of claim 4, further comprising:
transmitting, from the CU to the DU, an interface message indicating that the DU is to configure the MBS BWP.

6. The method of claim 4, further comprising:
receiving, at the DU and from the CU, a second interface message;
in response to receiving the second interface message, updating, by the DU, a configuration of the MBS BWP; and
transmitting, by the DU and to the UE, the updated configuration of the MBS BWP.

7. The method of claim 4, further comprising:
receiving, by the DU and from the CU, a third interface message; and
in response to receiving the third interface message, suspending the transmitting of the MBS information.

8. A base station comprising processing hardware and configured to implement the method of claim 1.

9. The method of claim 1, wherein the transmitting, by the base station, of the indication of the initial BWP and an indication of the MBS BWP includes transmitting, by the base station, a System Information Block (SIB) in which the indication of the initial BWP and the indication of the MBS BWP are included.

10. A method in a UE for accessing a radio access network (RAN) (105), the method comprising:
receiving, by the UE and from the RAN, an indication of an initial BWP and an indication of an MBS BWP, wherein the MBS BWP has a width that is larger than or same as a width of the initial BWP, and the MBS BWP includes a first MBS BWP and a second MBS BWP;
accessing, by the UE, the RAN via the initial BWP and the MBS BWP to communicate unicast information and MBS information with the RAN, respectively, including receiving MBS control information on a DL component of the first MBS BWP and receiving MBS data on a downlink (DL) component of the second MBS BWP.

11. The method of claim 10, further comprising receiving the unicast information on a DL component of the initial BWP.

12. A UE comprising processing hardware and configured to implement the method of claim 10.

13. The method of claim 10, wherein the receiving, by the UE, of the indication of the initial BWP and the indication of the MBS BWP includes receiving, by the UE, a System Information Block (SIB) in which the indication of the initial BWP and the indication of the MBS BWP are included.

* * * * *